United States Patent
Tanaka et al.

(10) Patent No.: US 10,871,156 B2
(45) Date of Patent: Dec. 22, 2020

(54) VALVE AND GAS CONTROL DEVICE

(71) Applicant: Murata Manufacturing Co., Ltd., Kyoto (JP)

(72) Inventors: Nobuhira Tanaka, Kyoto (JP); Daisuke Kondo, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 199 days.

(21) Appl. No.: 16/260,303

(22) Filed: Jan. 29, 2019

(65) Prior Publication Data

US 2019/0170133 A1 Jun. 6, 2019

Related U.S. Application Data

(63) Continuation of application No. PCT/JP2017/027381, filed on Jul. 28, 2017.

(30) Foreign Application Priority Data

Jul. 29, 2016 (JP) .................................. 2016-149302

(51) Int. Cl.
  *F04B 43/04* (2006.01)
  *F04B 45/047* (2006.01)
  (Continued)

(52) U.S. Cl.
  CPC .......... *F04B 43/046* (2013.01); *F04B 39/102* (2013.01); *F04B 39/1026* (2013.01);
  (Continued)

(58) Field of Classification Search
  CPC .. F04B 53/102; F04B 39/102; F04B 39/1026; F04B 45/047; F04B 43/046; F16K 7/12;
  (Continued)

(56) References Cited

U.S. PATENT DOCUMENTS 1,768,840 A * 7/1930 Holdsworth ............ F16K 15/16
  137/516.11
3,550,616 A * 12/1970 Graham .................. F16K 15/00
  137/513.7

(Continued)

FOREIGN PATENT DOCUMENTS

JP 2012-528981 A 11/2012
WO 2008/090725 A1 7/2008
  (Continued)

OTHER PUBLICATIONS

International Search Report for International Application No. PCT/JP2017/027381, dated Oct. 10, 2017.

(Continued)

*Primary Examiner* — Christopher S Bobish
(74) *Attorney, Agent, or Firm* — Pearne & Gordon LLP

(57) ABSTRACT

A valve includes a first plate, a side wall plate, a second plate, and a third plate. The first plate has a plurality of first vent holes. The second plate constitutes a valve chamber along with the first plate and the side wall plate. The second plate includes a second principal surface opposing a first principal surface of the first plate. The second plate has a plurality of second vent holes. The third plate has a plurality of third vent holes. The plurality of third vent holes overlaps with the plurality of first vent holes without overlapping with the plurality of second vent holes in a plan view in a direction in which the first plate and the second plate oppose each other. Both principal surfaces of the third plate oppose the first principal surface and the second principal surface. The third plate is disposed in the valve chamber.

21 Claims, 17 Drawing Sheets

(51) Int. Cl.
*F04B 53/10* (2006.01)
*F16K 99/00* (2006.01)
*F16K 7/12* (2006.01)
*F16K 15/14* (2006.01)
*F04B 39/10* (2006.01)
*F16K 7/17* (2006.01)

(52) U.S. Cl.
CPC .......... *F04B 45/047* (2013.01); *F04B 53/102* (2013.01); *F16K 7/12* (2013.01); *F16K 7/17* (2013.01); *F16K 15/141* (2013.01); *F16K 99/0015* (2013.01); *Y10T 137/7859* (2015.04)

(58) Field of Classification Search
CPC ...... F16K 7/17; F16K 99/0015; F16K 15/141; Y10T 137/7859
See application file for complete search history.

(56) References Cited

U.S. PATENT DOCUMENTS

| | | | | |
|---|---|---|---|---|
| 4,039,002 A * | 8/1977 | Broyan | ................. | F04B 39/108 137/516.17 |
| 4,130,131 A * | 12/1978 | Kucenty | ............... | F04B 39/106 137/512.1 |
| 4,483,363 A * | 11/1984 | Madoche | ............ | F04B 39/1033 137/329.04 |
| 8,141,573 B2 * | 3/2012 | Tai | ...................... | F16K 99/0015 137/15.19 |
| 8,297,947 B2 * | 10/2012 | Van Rensburg | ........ | F04B 43/04 417/413.2 |
| 9,109,592 B2 * | 8/2015 | Fujisaki | ................ | F04B 45/047 |
| 9,506,463 B2 * | 11/2016 | Locke | .................. | F04B 43/046 |
| 9,797,392 B2 * | 10/2017 | Locke | .................. | F04B 43/046 |
| 10,087,923 B2 * | 10/2018 | Campbell | ............. | F04B 19/006 |
| 2001/0035700 A1 * | 11/2001 | Percin | .................. | B41J 2/14201 310/324 |
| 2009/0232682 A1 * | 9/2009 | Hirata | ................... | F04B 43/046 417/413.2 |
| 2010/0074775 A1 | 3/2010 | Yamamoto et al. | | |
| 2011/0076170 A1 * | 3/2011 | Fujisaki | ................ | F04B 45/047 417/415 |
| 2012/0138180 A1 | 6/2012 | Buckland et al. | | |
| 2013/0236338 A1 * | 9/2013 | Locke | .................. | F04B 45/047 417/413.1 |
| 2015/0150470 A1 * | 6/2015 | Sano | .................. | A61B 5/02141 600/498 |
| 2017/0218949 A1 | 8/2017 | Yokoi et al. | | |

FOREIGN PATENT DOCUMENTS

| | | |
|---|---|---|
| WO | 2010/139918 A1 | 12/2010 |
| WO | WO-2010139918 A1 * | 12/2010 ............ F04B 45/047 |
| WO | 2016/063711 A1 | 4/2016 |

OTHER PUBLICATIONS

Written Opinion for International Application No. PCT/JP2017/027381, dated Oct. 10, 2017.

* cited by examiner

VALVE AND GAS CONTROL DEVICE

This is a continuation of International Application No. PCT/JP2017/027381 filed on Jul. 28, 2017 which claims priority from Japanese Patent Application No. 2016-149302 filed on Jul. 29, 2016. The contents of these applications are incorporated herein by reference in their entireties.

BACKGROUND OF THE DISCLOSURE

Field of the Disclosure

An embodiment according to the present disclosure relates to a valve for directing a flow of gas in one direction and a gas control device including the stated valve.

Description of the Related Art

Various types of valves configured to direct a flow of gas in one direction have been disclosed. For example, in Patent Document 1, as illustrated in FIGS. 18 and 19, there is disclosed a valve 910 including two plates 914, 916 close to each other and a flap 917 interposed between the two plates 914 and 916. An arrow 932 in FIG. 18 indicates a flow of the air.

A plurality of vent holes 920 is provided in the plate 916. In addition, a plurality of vent holes 918 is provided in the plate 914. Further, the plate 914 is provided with a plurality of auxiliary holes 928. The auxiliary hole 928 has the same shape as that of the vent hole 920. The plurality of vent holes 918 and the plurality of auxiliary holes 928 communicate with a suction hole of a pump (not illustrated).

The valve 910 opens or closes the vent hole 920 by pulling the flap 917 against the plate 914 or the plate 916 by the wind generated by the pump. In this manner, the valve 910 directs the flow of the air in one direction.

Patent Document 1: Japanese Unexamined Patent Application Publication (Translation of PCT Application) No. 2012-528981

BRIEF SUMMARY OF THE DISCLOSURE

However, in the valve 910 of Patent Document 1, the area of the vent hole 918 and that of the vent hole 920 are small, so that the flow path resistance is large. Further, the length of a flow path from the vent hole 918 to the vent hole 920 is long, so that the flow path resistance in proportion to the length of the flow path is also large. Therefore, in the valve 910 of Patent Document 1, there is a problem that the flow rate of the air passing through the inside of the valve 910 is significantly decreased.

Accordingly, an object of an embodiment of the present disclosure is to provide a valve and a gas control device configured to function to direct a flow of gas in one direction and capable of allowing the gas to pass through without decreasing a flow rate of the gas as much as possible.

A valve according to an embodiment of the present disclosure includes a first plate, a side wall plate, a second plate, and a third plate. The first plate has a plurality of first vent holes. The second plate constitutes a valve chamber along with the first plate and the side wall plate. The second plate includes a second principal surface opposing a first principal surface of the first plate. The second plate has a plurality of second vent holes. The third plate has a plurality of third vent holes. The plurality of third vent holes overlaps with the plurality of first vent holes without overlapping with the plurality of second vent holes in a plan view in a direction in which the first plate and the second plate oppose each other. Both principal surfaces of the third plate oppose the first principal surface of the first plate and the second principal surface of the second plate. The third plate is disposed in the valve chamber.

In a plan view of the direction in which the first plate and the second plate oppose each other, an outer circumference of a predetermined second vent hole and an outer circumference of a predetermined third vent hole closest to the predetermined second vent hole include opposing edges matching each other. A distance between the predetermined second vent hole and the predetermined third vent hole at the opposing edges is equal to or less than 1.2 times the shortest distance between the outer circumference of the predetermined second vent hole and the outer circumference of the predetermined third vent hole.

In this configuration, at the opposing edges, a distance between the outer circumference of the second vent hole and the outer circumference of the third vent hole closest to the outer circumference of the second vent hole falls within a predetermined range. As a result, the second and third vent holes do not overlap with each other and the distance between the second vent hole and the third vent hole falls within a set range in a plan view in the direction in which the first plate and the second plate oppose each other. Thus, the gas flow is directed in one direction, and the gas passing through the second vent hole and the third vent hole is unlikely to be subjected to unnecessary flow path resistance, thereby making it possible to generate a smooth flow of the gas.

A valve according to an embodiment of the present disclosure includes a first plate, a side wall plate, a second plate, and a third plate. The first plate has a plurality of first vent holes. The second plate constitutes a valve chamber along with the first plate and the side wall plate. The second plate has a plurality of second vent holes formed in a line-symmetric shape. The third plate has a plurality of third vent holes, formed in a line-symmetric shape, that does not oppose the plurality of second vent holes but opposes the plurality of first vent holes. The third plate is disposed in the valve chamber.

Each of the third vent holes and each of the second vent holes are aligned adjacent to each other in a plan view in a direction in which the second plate and the third plate oppose each other. A distance in a plan view from the center of gravity of the second vent hole to an outer circumference of the second vent hole has a first distance that is shortest in a first direction connecting the center of gravity of the second bent hole and the center of gravity of the third vent hole close to the second vent hole. In a predetermined direction other than the first direction, a distance from the center of gravity of the second vent hole to the outer circumference of the second vent hole is longer than the first distance. In this specification, the term "center of gravity" refers to, in a case where a predetermined space is assumed to be filled with a material, a place to be the center of gravity of the stated space.

In this configuration, the total area of the plurality of second vent holes is wider than that of the known vent holes 920, so that the flow path resistance of the valve becomes smaller. Further, the flow path from the second vent hole to the third vent hole is shorter in length than the flow path from the known vent hole 920 to the known vent hole 918, so that the flow path resistance of the valve in proportion to the length of the flow path also becomes smaller.

Further, it is necessary for the distance between the outer circumference of the second vent hole and the outer circumference of the third vent hole to be equal to or longer than a set length. The set length is set in view of the manufacturing tolerance of the second vent hole and the third vent hole so that the second vent hole and the third vent hole do not overlap with each other in a plan view. Further, it is preferable that the distance between the outer circumference of the second vent hole and the outer circumference of the third vent hole be equal to or longer than the set length and be as short as possible in order to make the flow path resistance small.

Accordingly, the valve according to the embodiment of the present disclosure functions to direct the flow of gas in one direction and can allow the gas to pass through without decreasing the flow rate of the gas as much as possible.

A valve according to an embodiment of the present disclosure includes a first plate, a side wall plate, a second plate, and a third plate. The first plate has a plurality of first vent holes. The second plate constitutes a valve chamber along with the first plate and the side wall plate. The second plate has a plurality of second vent holes formed in a line-symmetric shape. The third plate has a plurality of third vent holes, formed in a line-symmetric shape, that does not oppose the plurality of second vent holes but opposes the plurality of first vent holes. The third plate is disposed in the valve chamber.

Each of the third vent holes and each of the second vent holes are aligned adjacent to each other in a plan view of the second plate and the third plate in a direction in which the second and third plates oppose each other. A distance in a plan view from the center of gravity of the second vent hole to an outer circumference of the second vent hole has a first distance that is shortest in a first direction connecting the center of gravity of the second bent hole and the center of gravity of the third vent hole close to the second vent hole. In a predetermined direction other than the first direction, a distance from the center of gravity of the second vent hole to the outer circumference of the second vent hole is longer than the first distance.

In this configuration, the total area of the plurality of third vent holes is wider than that of the known vent holes 920, so that the flow path resistance of the valve becomes smaller. Further, the flow path from the second vent hole to the third vent hole is shorter in length than the flow path from the known vent hole 920 to the known vent hole 918, so that the flow path resistance of the valve in proportion to the length of the flow path also becomes smaller.

Further, the first distance needs to be equal to or longer than a set length. The set length is set in view of the manufacturing tolerance of the second vent hole and the third vent hole so that the second vent hole and the third vent hole do not overlap with each other in a plan view.

Accordingly, the valve according to the embodiment of the present disclosure functions to direct the flow of gas in one direction and can allow the gas to pass through without decreasing the flow rate of the gas as much as possible.

A gas control device according to an embodiment of the present disclosure includes the valve according to the above embodiment of the present disclosure and a pump connected to the valve.

Therefore, the gas control device according to the embodiment of the present disclosure obtains the same effects as those obtained in the valve according to the above embodiment of the present disclosure.

The embodiment according to the present disclosure functions to direct the flow of gas in one direction and can allow the gas to pass through without decreasing the flow rate of the gas as much as possible.

DETAILED DESCRIPTION OF THE DISCLOSURE

First Embodiment

Hereinafter, a gas control device 111 according to a first embodiment of the present disclosure will be described.

Figure 1:
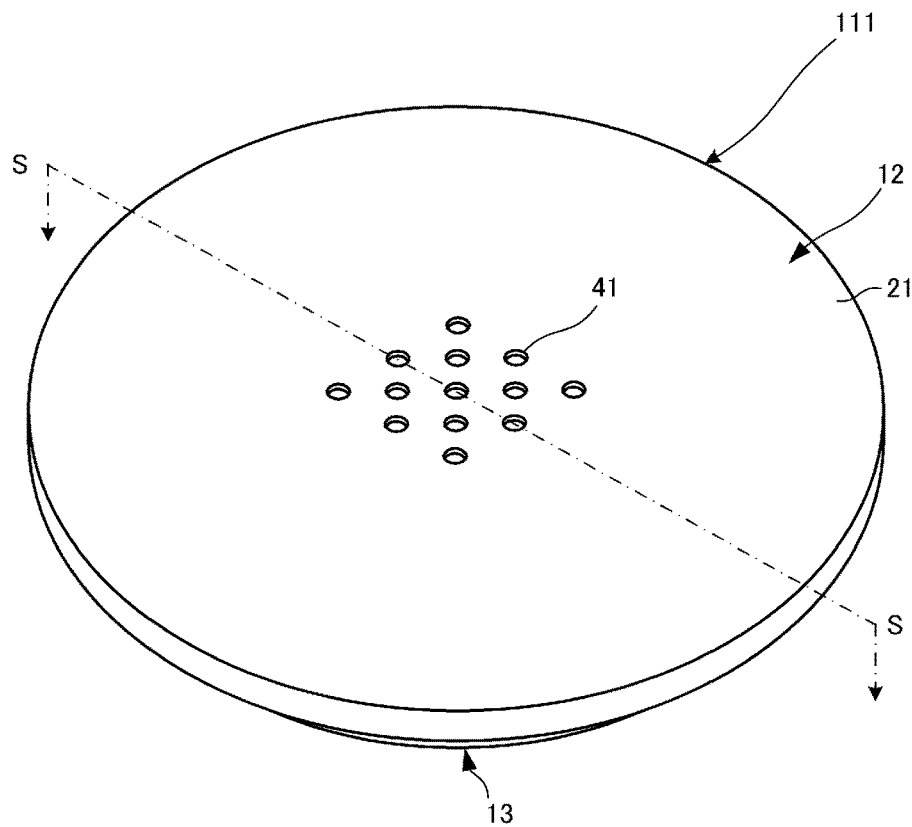
FIG. 1 is an external-appearance perspective view of a gas control device 111 according to a first embodiment of the present disclosure when seen from a top surface side of the gas control device 111.
Figure 2:
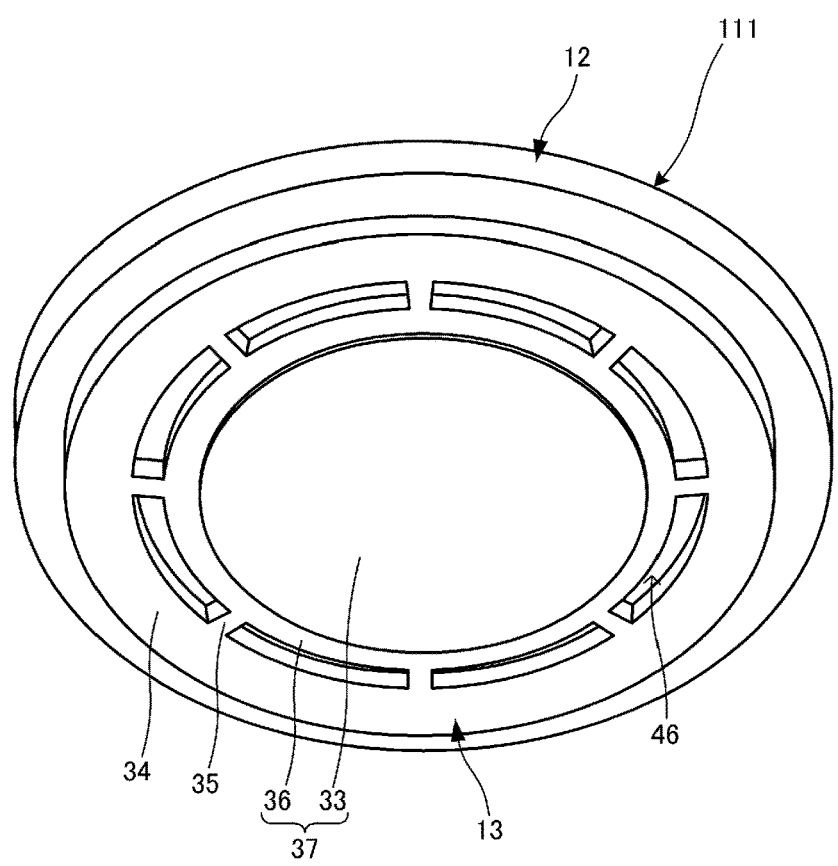
FIG. 2 is an external-appearance perspective view of the gas control device 111 when seen from a bottom surface side of the gas control device 111 illustrated in FIG. 1.
Figure 3:
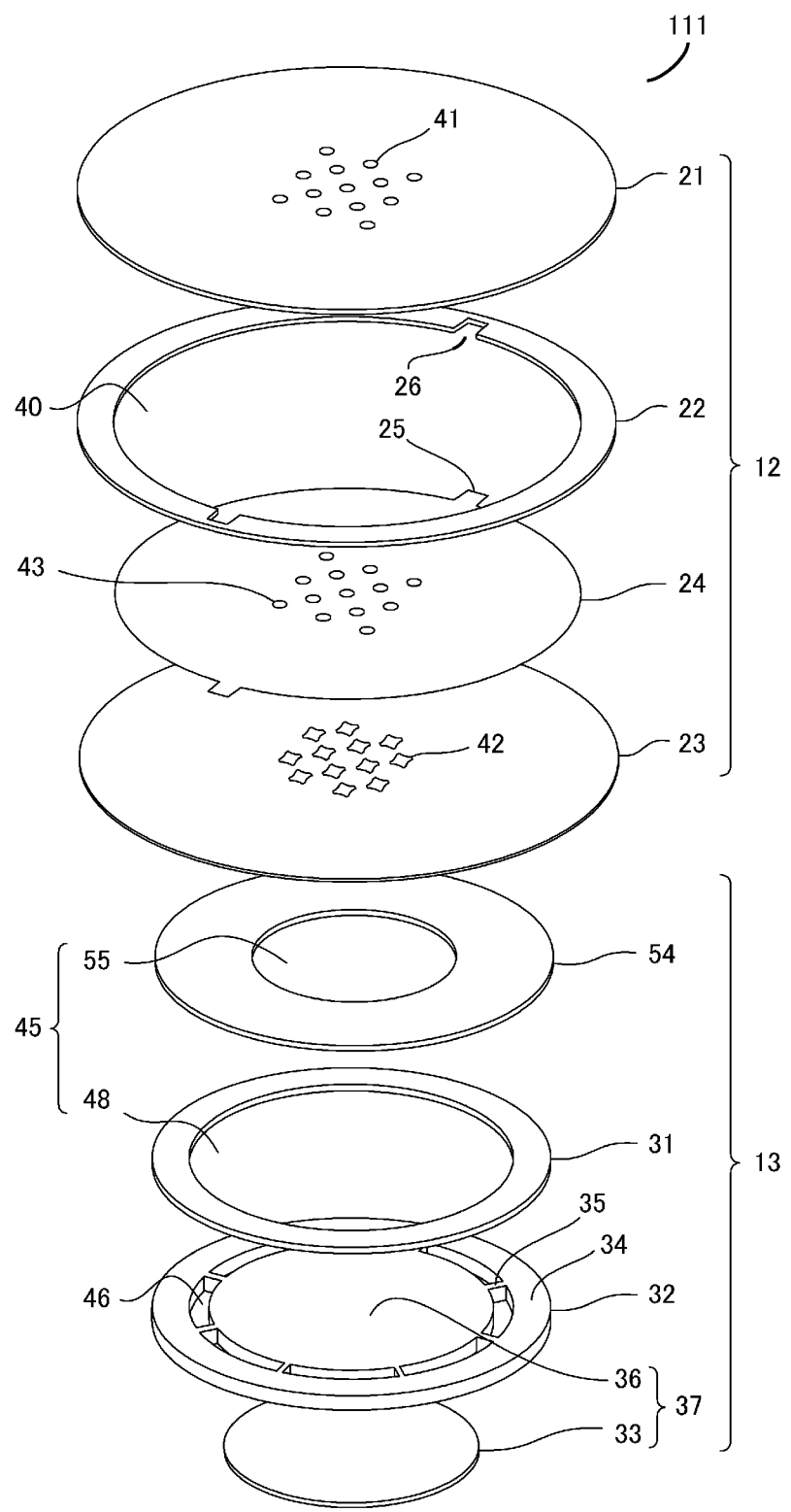
FIG. 3 is an exploded perspective view of the gas control device 111 illustrated in FIG. 1.
Figure 4:
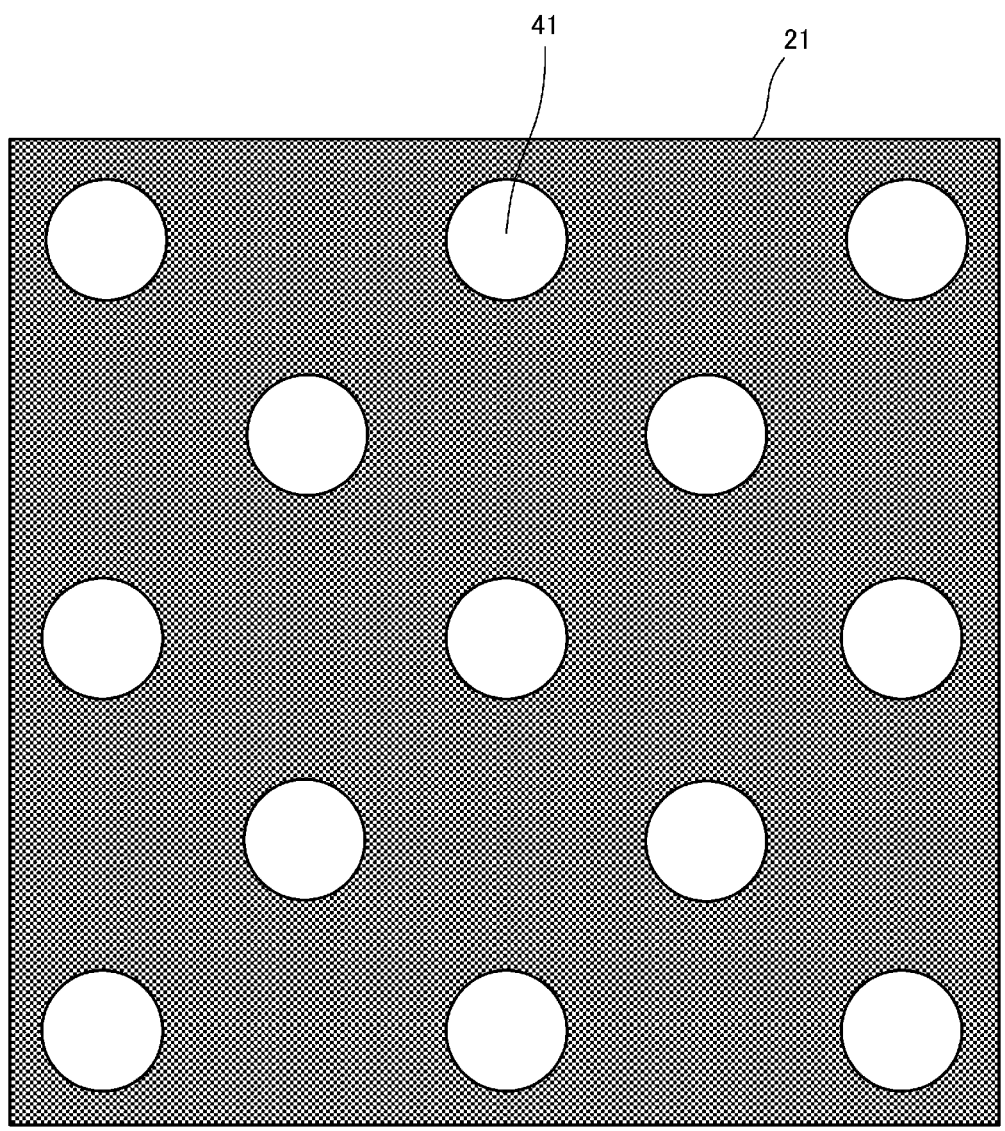
FIG. 4 is a plan view of a central portion of a top plate 21 illustrated in FIG. 3.
Figure 5:
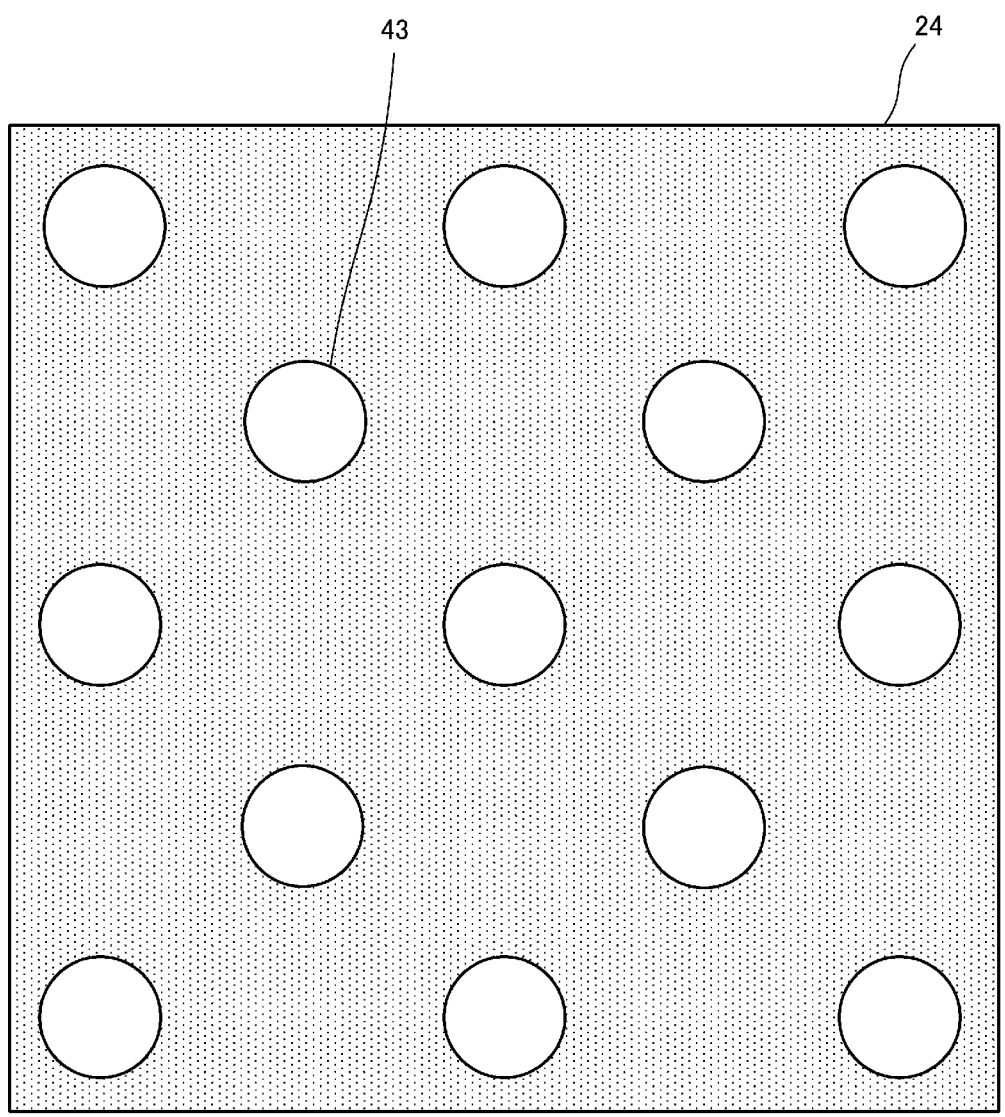
FIG. 5 is a plan view of a central portion of a movable plate 24 illustrated in FIG. 3.
Figure 6:
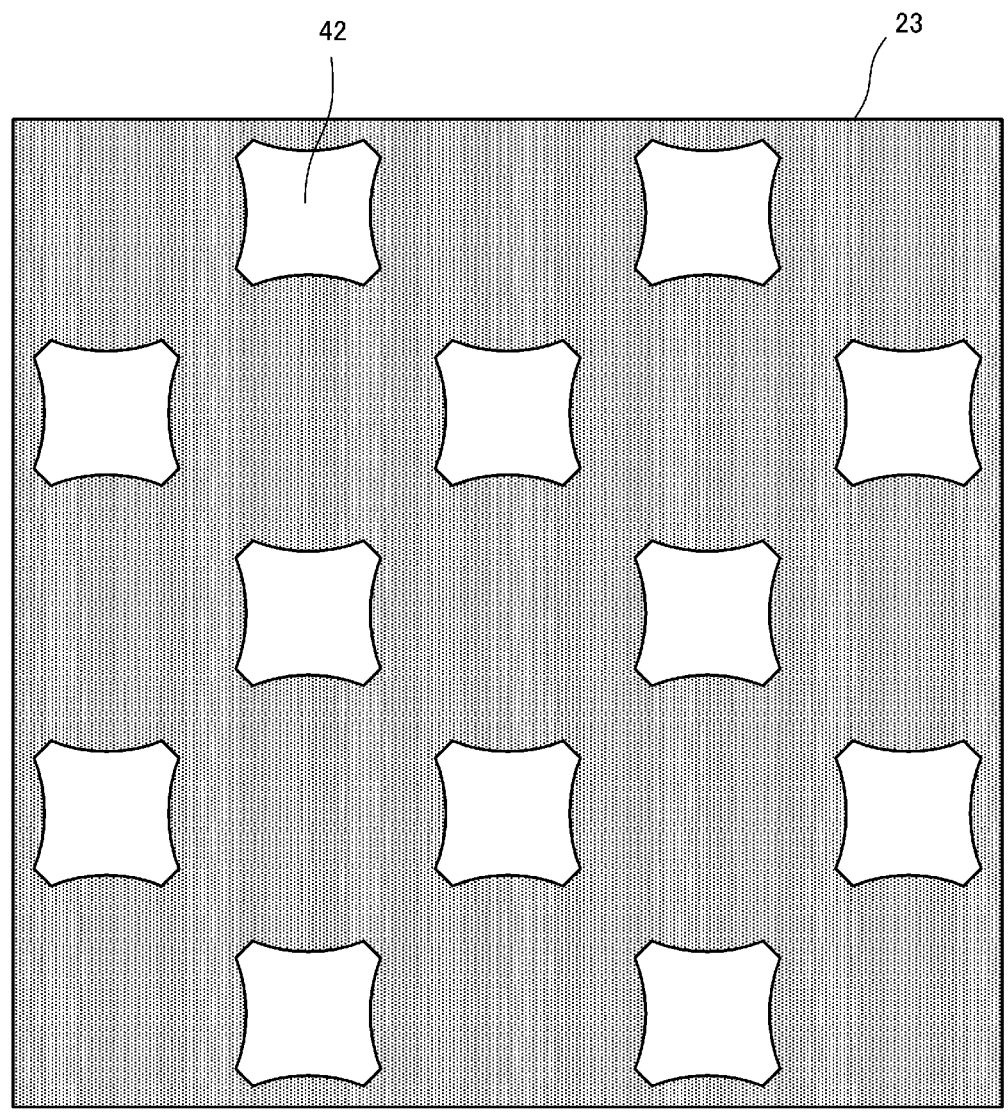
FIG. 6 is a plan view of a central portion of a bottom plate 23 illustrated in FIG. 3.
Figure 7:
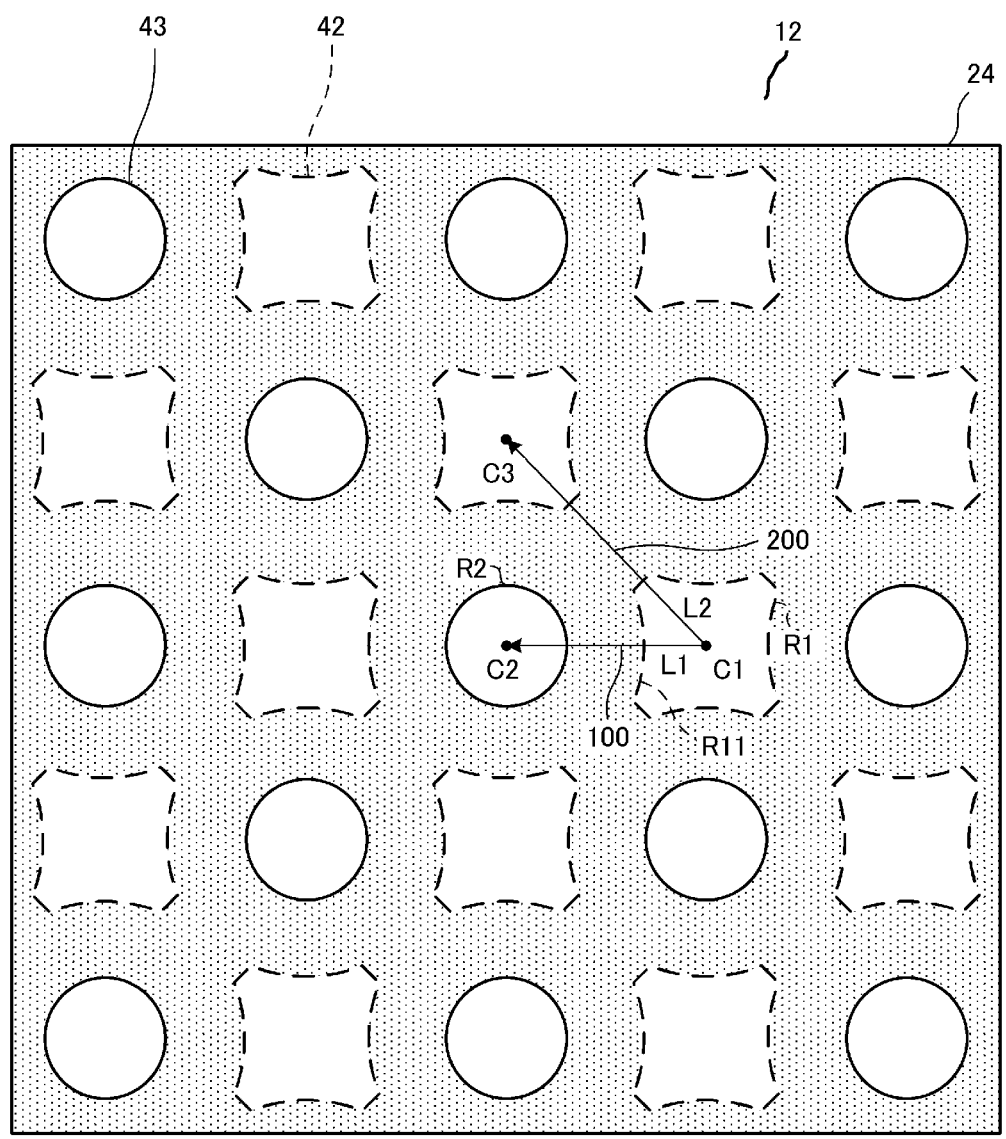
FIG. 7 is a transparent plan view of the central portion of the movable plate 24 illustrated in FIG. 3.
Figure 8:
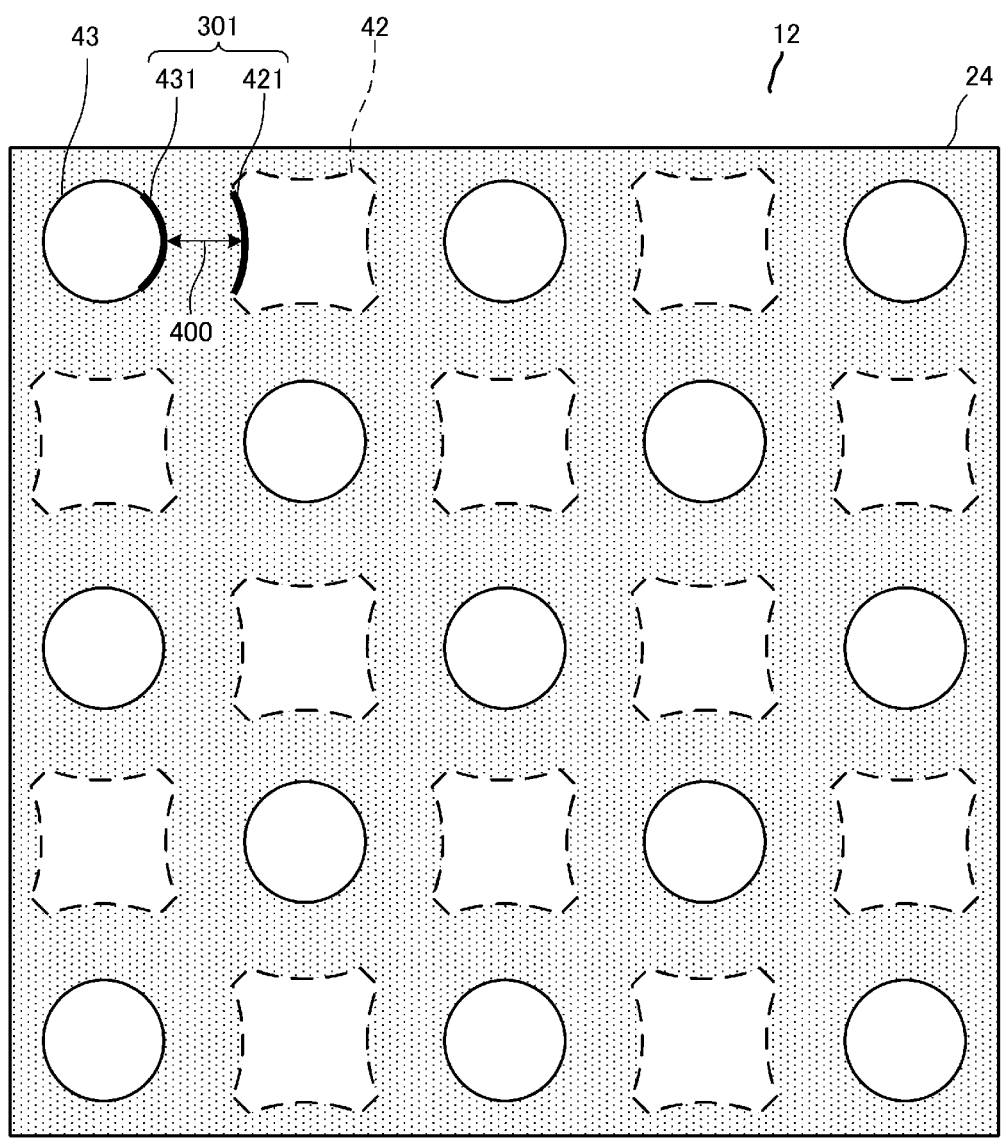
FIG. 8 is a transparent plan view of the central portion of the movable plate 24 illustrated in FIG. 3.
Figure 9:
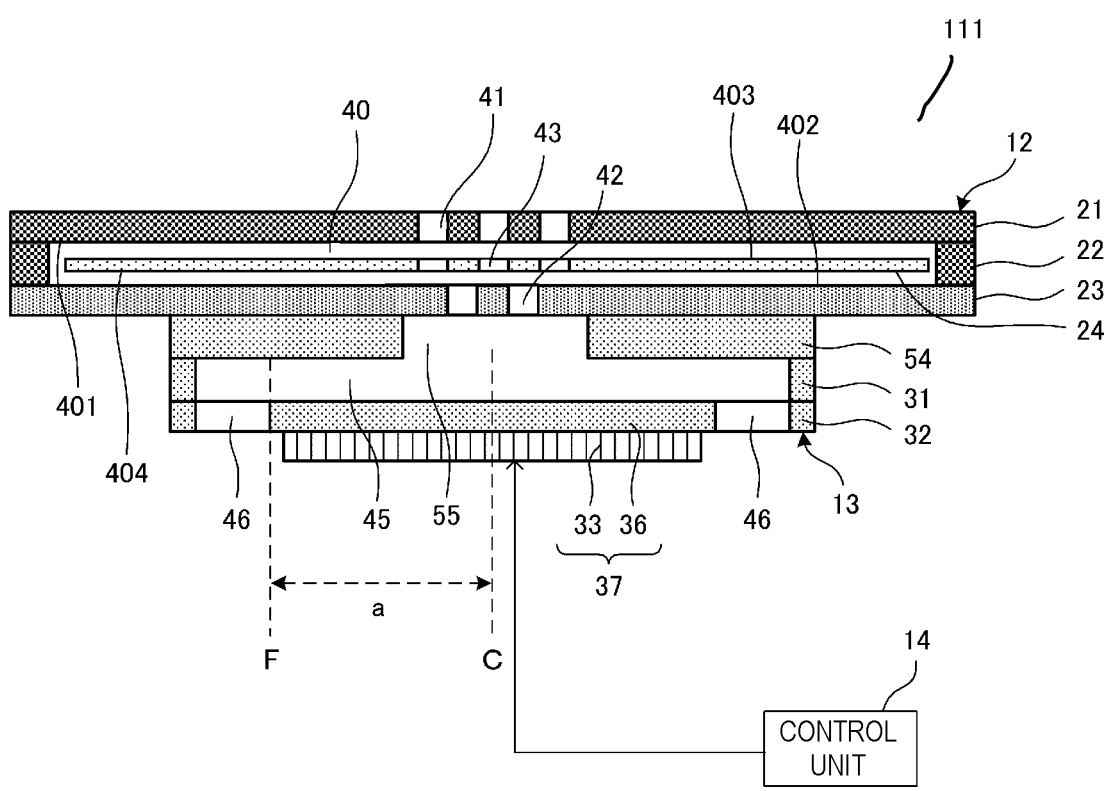
FIG. 9 is a cross-sectional view taken along a line S-S illustrated in FIG. 1.

FIG. 1 is an external-appearance perspective view of the gas control device 111 according to the first embodiment of the present disclosure when seen from a top surface side of the gas control device 111. FIG. 2 is an external-appearance perspective view of the gas control device 111 when seen from a bottom surface side of the gas control device 111 illustrated in FIG. 1. FIG. 3 is an exploded perspective view of the gas control device 111 illustrated in FIG. 1. FIG. 4 is a plan view of a central portion of a top plate 21 illustrated in FIG. 3. FIG. 5 is a plan view of a central portion of a movable plate 24 illustrated in FIG. 3. FIG. 6 is a plan view of a central portion of a bottom plate 23 illustrated in FIG. 3. FIGS. 7 and 8 are transparent plan views of the central portion of the movable plate 24 illustrated in FIG. 3. FIG. 9 is a cross-sectional view taken along a line S-S illustrated in FIG. 1.

As illustrated in FIGS. 1 to 3, the gas control device 111 includes a valve 12, a pump 13, and a control unit 14 (see FIG. 9). As illustrated in FIGS. 1 and 3, the valve 12 is disposed on the top surface side of the gas control device 111. As illustrated in FIGS. 2 and 3, the pump 13 is disposed on the bottom surface side of the gas control device 111. The valve 12 and the pump 13 are connected to each other in a laminated state.

The valve 12 has a function of directing a gas flow in one direction. The valve 12 is formed in a cylindrical container shape in which a valve chamber 40 is provided therein. As illustrated in FIGS. 1 and 3, the valve 12 includes the top plate 21, a side wall plate 22, the bottom plate 23, and the movable plate 24.

Note that the valve 12 corresponds to an example of a valve of the present disclosure. The pump 13 corresponds to an example of a pump of the present disclosure. The top plate 21 corresponds to an example of a first plate of the present disclosure. The bottom plate 23 corresponds to an example of a second plate of the present disclosure. The movable plate 24 corresponds to an example of a third plate of the present disclosure.

The top plate 21, the side wall plate 22, and the bottom plate 23 are made of, for example, metal. The top plate 21, the side wall plate 22, and the bottom plate 23 are made of, for example, stainless steel (SUS). The movable plate 24 is made of resin. Here, it is preferable that the movable plate 24 be transparent. The movable plate 24 is made of, for example, semi-transparent polyimide.

The top plate 21 is disposed on the top surface side of the valve 12. The side wall plate 22 is provided between the top plate 21 and the bottom plate 23. The bottom plate 23 is provided on the bottom surface side of the valve 12. The top plate 21, the side wall plate 22, and the bottom plate 23 are connected to each other in a laminated state. The movable plate 24 is provided in an internal space of the valve 12, i.e., in the valve chamber 40. In other words, as illustrated in FIG. 9, a first principal surface 401 of the top plate 21 is so disposed as to oppose a second principal surface 402 of the bottom plate 23. The movable plate 24 has a third principal surface 403 and a fourth principal surface 404. The movable plate 24 is disposed in such a manner that the third principal surface 403 opposes the first principal surface 401 of the top plate 21, and the fourth principal surface 404 opposes the second principal surface 402 of the bottom plate 23. The top plate 21 is formed in a disk shape. The side wall plate 22 is formed in an annular shape when viewed from the top surface side. The bottom plate 23 is formed in a disk shape. The top plate 21, the side wall plate 22, and the bottom plate 23 have the same outer circumference diameter in size.

The valve chamber 40 is formed in a circular cylinder shape. The valve chamber 40 is provided, with a predetermined diameter, at the center of the side wall plate 22. The movable plate 24 has a substantially disk-like shape when viewed from the top surface side. The thickness of the movable plate 24 is set to be thinner than the thickness of the side wall plate 22.

In the present embodiment, the thickness of the side wall plate 22 (height of the valve chamber 40) is set to be equal to or greater than 40 μm and equal to or smaller than and the thickness of the movable plate 24 is set to be equal to or greater than 5 μm and equal to or smaller than 10 μm. Further, the movable plate 24 is set to have an extremely light mass in order to be movable up and down in the valve chamber 40 by the discharge air from the pump 13.

The outer circumference diameter of the movable plate 24 is almost equal to the opening diameter of the valve chamber 40 in the side wall plate 22, and is set to be slightly smaller than the opening diameter so that there is provided a small gap. In addition, a projection 25 is provided on a part of the outer circumference of the movable plate 24 (see FIG. 3).

Further, a cutout 26 is provided in a part of the inner circumference of the side wall plate 22, so that the projection 25 is fitted into the cutout 26 in a state in which a tiny gap is provided therebetween (see FIG. 3). Due to this, the movable plate 24 is held inside the valve chamber 40 so as to be not rotatable and to be movable up and down.

A plurality of first vent holes 41 arranged in a predetermined array form is provided at the center of the top plate 21. Further, a plurality of second vent holes 42 arranged in a predetermined array form is provided at the center of the bottom plate 23. Furthermore, a plurality of third vent holes 43 arranged in a predetermined array form is provided at the center of the movable plate 24. Accordingly, the valve chamber 40 communicates with the exterior through the first vent holes 41, and communicates with a pump chamber 45 through the second vent holes 42.

Here, the plurality of third vent holes 43 and the plurality of first vent holes 41 are so provided as to oppose each other. The plurality of third vent holes 43 and the plurality of second vent holes 42 are provided so as not to oppose each other.

As illustrated in FIG. 7, each third vent hole 43 of the plurality of third vent holes 43 and each second vent hole 42 of the plurality of second vent holes 42 are alternately disposed so as to be adjacent to each other in a plan view of the movable plate 24 or the bottom plate 23. The second vent hole 42 has an octagonal shape. The third vent hole 43 has a circular shape. Therefore, it is easy to form the third vent hole 43. Further, by forming the third vent hole 43 in a circular shape, the flow path resistance against the gas passing through the third vent hole 43 can be made small so that the smooth movement thereof can be achieved. Further, the second vent hole 42 is surrounded by four or more of the third vent holes 43 in a plan view of the movable plate 24 or the bottom plate 23. Therefore, the number of the directions in which the gas flows increases, so that the flow path resistance is reduced.

Of the distances from a center of gravity C1 of the second vent hole 42 to an outer circumference R1 of the second vent hole 42, a first distance L1 in a first direction 100 connecting the center of gravity C1 of the second vent hole 42 and a center of gravity C2 of the third vent hole 43 is the shortest, and a distance from the center of gravity C1 of the second vent hole 42 to the outer circumference R1 of the second vent hole 42 in a predetermined direction other than the first direction 100 is longer than the first distance L1.

In particular, of the distances from the center of gravity C1 of the second vent hole 42 to the outer circumference R1 of the second vent hole 42, a second distance L2 in a second direction 200 connecting the center of gravity C1 and a center of gravity C3 of the two second vent holes 42 adjacent to each other is the longest. The outer circumference R1 of the second vent hole 42 includes a segment R11 present at the same distance from a set region on an outer circumference R2 of the third vent hole 43. The segment R11 is formed in an arc shape taking the center of gravity C2 of the third vent hole 43 as its center. In other words, at least a part of the outer circumference R1 (segment R11) of the second vent hole 42 is substantially parallel to the outer circumference R2 of the third vent hole 43 closest to the outer circumference R1 of the second vent hole 42. Accordingly, since the second vent hole 42 and the third vent hole 43 can be formed at uniform intervals, the flow of the gas in the valve chamber 40 is unlikely to be uneven.

In a case where the second vent hole 42 and the third vent hole 43 overlap with each other in a plan view of the movable plate 24 or the bottom plate 23, the upstream and the downstream communicate with each other. In this case, the valve 12 cannot perform the function of directing the gas flow in one direction.

Therefore, it is necessary that the distance between the outer circumference R1 of the second vent hole 42 and the outer circumference R2 of the third vent hole 43 is equal to or longer than a set length. It is preferably for the set length to be set in view of the manufacturing tolerance of the second vent hole 42 and the third vent hole 43. For example, in a case where the manufacturing tolerance is 100 µm, it is preferable for the set length to be 100 µm to 200 µm, that is, 1.0 to 2.0 times the manufacturing tolerance. This is because, in the case where the distance between the outer circumference R1 of the second vent hole 42 and the outer circumference R2 of the third vent hole 43 is equal to or longer than the set length, it is preferable to make the distance short as much as possible in consideration of decreasing the flow path resistance. Further, in a plan view in a direction in which the top plate 21 and the bottom plate 23 oppose each other, the second vent hole 42 and the third vent hole 43 do not overlap with each other, and the outer circumference R1 of the second vent hole 42 and the outer circumference R2 of the third vent hole 43 closest to the stated outer circumference R1 include opposing edges 301 matching each other. The distance between the second vent hole 42 and the third vent hole 43 at the opposing edges 301 is equal to or less than 1.2 times the shortest distance between the second vent hole 42 and the third vent hole 43. Therefore, the gas flow is directed in one direction, and the gas passing through the second vent hole 42 and the third vent hole 43 is unlikely to be subjected to unnecessary flow path resistance so that a smooth flow of the gas can be generated. Conversely, if the shortest distance between the second vent hole 42 and the third vent hole 43 exceeds 1.2 times, unnecessary flow path resistance increases, thereby making it difficult to generate a smooth flow of the gas.

Note that, as illustrated in FIG. 8, the outer circumferences of all the second vent holes 42 and the outer circumferences of all the third vent holes 43 closest to the stated outer circumferences of the second vent holes 42 respectively include the opposing edges 301 matching each other. The opposing edges 301 are formed of an opposing edge 421, which is a partial region in the outer circumference of the second vent hole 42, and an opposing edge 431, which is a partial region in the outer circumference of the third vent hole 43. The distance between the second vent hole 42 and the third vent hole 43 at the opposing edges 301, i.e., the opposing edge 421 and the opposing edge 431, is equal to or less than 1.2 times the shortest distance between the second vent hole 42 and the third vent hole 43. This prevents the gas flow from being concentrated on a specific second vent hole 42 or a specific third vent hole 43, thereby making it possible to generate a smoother gas flow.

The expression that the outer circumference of the second vent hole 42 and the outer circumference of the third vent hole 43 match each other means that the outer circumference of the second vent hole 42 is shaped along the shape of the outer circumference of the third vent hole 43. To be more specific, it means that the shape of the outer circumference of the second vent hole 42 is parallel or substantially parallel to the shape of the outer circumference of the third vent hole 43. In other words, a region of the outer circumference (opposing edge 421) of the second vent hole 42 and a region of the outer circumference (opposing edge 431) of the third vent hole 43 where the outer circumference of the second vent hole 42 and the outer circumference of the third vent hole 43 match each other, are referred to as the opposing edges 301.

In addition, an area of the second vent hole 42 may be larger than an area of the third vent hole 43. In such a configuration, the amount of gas that can pass through the second vent hole 42 or the third vent hole 43 per unit time depends on the size of the vent hole. In other words, the amount of gas passing through the second vent hole 42 is larger than the amount of gas passing through the third vent hole 43. Therefore, the gas having passed through the third vent hole 43 can quickly pass through the second vent hole 42, so that a smooth movement of the gas can be achieved.

In contrast, the area of the third vent hole 43 may be larger than the area of the second vent hole 42. In such a configuration, the amount of gas that can pass through the third vent hole 43 per unit time becomes larger in comparison with the second vent hole 42. Therefore, the third vent hole 43 will not come to be a rate-limiting element in the movement of the gas, and the responsiveness of the movable plate 24 is improved, thereby making it possible to achieve the smooth movement of the gas.

Next, as illustrated in FIGS. 2, 3, and 9, the pump 13 is a type of pump using a vibration body 36, which is bent and deformed by the application of a voltage to a piezoelectric element 33. As illustrated in FIGS. 2 and 3, the pump 13 is formed in a cylindrical container shape, and the pump chamber 45 is provided inside of the pump 13.

The pump 13 includes a vibration adjustment plate 54, a side wall plate 31, a vibration plate 32, and the piezoelectric element 33. The vibration adjustment plate 54, the side wall plate 31, and the vibration plate 32 are made of metal. The vibration adjustment plate 54, the side wall plate 31, and the vibration plate 32 are made of, for example, stainless steel.

The side wall plate 31 is disposed between the bottom plate 23 and the vibration plate 32. The vibration plate 32 is disposed between the side wall plate 31 and the piezoelectric element 33. The piezoelectric element 33 is disposed on a bottom surface side of the pump 13. The side wall plate 31 is attached in a state of being laminated on the bottom surface of the bottom plate 23. Further, the side wall plate 31, the vibration plate 32, and the piezoelectric element 33 are attached to each other in a laminated state.

The vibration adjustment plate 54 is provided for adjusting a vibration region of the bottom plate 23. To be specific, the vibration adjustment plate 54 is attached in a state of being disposed between the bottom plate 23 and the side wall plate 31. The vibration adjustment plate 54 is formed in an annular shape when viewed from the top surface side.

At the center of the vibration adjustment plate 54, a pump upper chamber 55 is provided with a predetermined opening diameter. The pump upper chamber 55 has an opening diameter smaller than that of a pump lower chamber 48. The pump upper chamber 55 and the pump lower chamber 48 constitute the pump chamber 45. Further, the vibration body 36 is formed so that the pump chamber 45 has a radius "a". In addition, the vibration adjustment plate 54 and the side wall plate 31 have the same outer circumference diameter in size.

By providing the vibration adjustment plate 54 on the bottom plate 23, it is possible to partially increase the rigidity of the bottom plate 23 in the vicinity of the outer circumference portion thereof. Thus, it is possible that the bottom plate 23 is vibrated only in the vicinity of the central portion facing the pump upper chamber 55, and almost no vibration is generated in the vicinity of the outer circumference portion of the bottom plate 23.

Accordingly, a range in which the vibration of the bottom plate 23 is generated can be set by the opening diameter of the pump upper chamber 55 in the vibration adjustment plate 54. Thus, it is possible to easily adjust the vibration region of the bottom plate 23, a structural resonant frequency, or the like without changing the plate thickness, the outer circumference diameter, or the like of the bottom plate 23.

Since the vibration in the vicinity of the central portion of the bottom plate 23 mainly contributes to the gas vibration, the vibration of the movable plate 24, and the like, it is possible to sufficiently obtain the effects of improving the responsiveness, increasing the suction flow rate, and the like of the valve 12, even in the case where the vicinity of the outer circumference portion of the bottom plate 23 does not vibrate.

The side wall plate 31 is formed in an annular shape when viewed from the top surface side. At the center of the side wall plate 31, the pump lower chamber 48 is provided with a predetermined opening diameter.

Further, the vibration plate 32 includes an outer circumference portion 34, a plurality of beams 35, and the vibration body 36. The outer circumference portion 34 has an annular shape. The vibration body 36 has a disk shape. The vibration body 36 is disposed within the opening of the outer circumference portion 34 in a state in which a gap is provided between the vibration body 36 and the outer circumference portion 34. The plurality of beams 35 is provided in the gap between the outer circumference portion 34 and the vibration body 36, extends along a circumferential direction of the vibration plate 32, and connects the vibration body 36 and the outer circumference portion 34.

Accordingly, the vibration body 36 is supported in midair with the beams 35 interposed between the vibration body 36 and the outer circumference portion 34, and is movable up and down in the thickness direction. The gap portion (cavity) between the outer circumference portion 34 and the vibration body 36 is provided as a suction hole 46.

In addition, the side wall plate 31 and the outer circumference portion 34 of the vibration plate 32 have the same outer circumference diameter in size and the same opening diameter in size. The outer circumference diameter of the side wall plate 31 and the vibration plate 32 is set to be smaller than the outer circumference diameter of the valve 12 by a set dimension.

The piezoelectric element 33 has a disk shape whose radius is smaller than that of the vibration body 36 when viewed from the top surface side. The piezoelectric element 33 is attached to a bottom surface of the vibration body 36. The piezoelectric element 33 is made of, for example, PZT-based ceramics. Since the piezoelectric element 33 is made of a piezoelectric material, it is excellent in responsiveness. For this reason, the piezoelectric element 33 can be driven at high frequency.

Electrodes (not illustrated) are formed on both principal surfaces of the piezoelectric element 33, and a driving voltage is applied from the control unit 14 through the electrodes. The piezoelectric element 33 has piezoelectricity configured to expand and contract in a surface direction in accordance with a driving voltage applied thereto.

Accordingly, when a driving voltage is applied to the piezoelectric element 33, the piezoelectric element 33 expands and contracts in the surface direction, and bending vibrations are generated in a concentric manner in the vibration body 36. Due to the above bending vibrations, vibrations are also generated in the beam 35 elastically supporting the vibration body 36, so that the vibration body 36 vibrates so as to be displaced up and down. Thus, the piezoelectric element 33 and the vibration body 36 constitute an actuator 37, and vibrate integrally.

The control unit 14 is constituted by, for example, a microcomputer. In this embodiment, the control unit 14 adjusts a driving frequency of the piezoelectric element 33 to a resonant frequency of the pump chamber 45. The resonant frequency of the pump chamber 45 is a frequency at which pressure vibrations generated at a central portion of the pump chamber 45 resonate with the stated pressure vibrations after the stated pressure vibrations are propagated from the central portion of the pump chamber 45 toward the outer circumference portion side, are reflected therefrom, and arrive at the central portion of the pump chamber 45 again.

With the above adjustment, the vicinity of the central portion in a plane direction is made to be an antinode of the bending vibrations, and the vicinity of the outer circumference portion in the plane direction is made to be a node of the bending vibrations. In other words, in the pump chamber 45, the pressure distribution formed in a standing wave shape is generated in the plane direction.

With this, in the vicinity of the second vent hole 42 provided opposing the central portion in the plane direction of the pump chamber 45, the pressure fluctuation of the gas becomes large, and in the vicinity of the suction hole 46 provided opposing the outer circumference portion in the plane direction of the pump chamber 45, there is almost no pressure fluctuation of the gas.

Accordingly, in a case where the suction hole 46 is made to communicate with the outer circumference portion in the plane direction of the pump chamber 45, there will be almost no pressure loss through the suction hole 46 even if a valve or the like is not provided in the suction hole 46. Accordingly, the suction hole 46 can have an arbitrary shape, size, and the like, thereby making it possible to achieve a large amount of gas flow rate, or the like.

Next, a flow of the air in the gas control device 111 will be described while the pump 13 is driven.

Figure 10A:
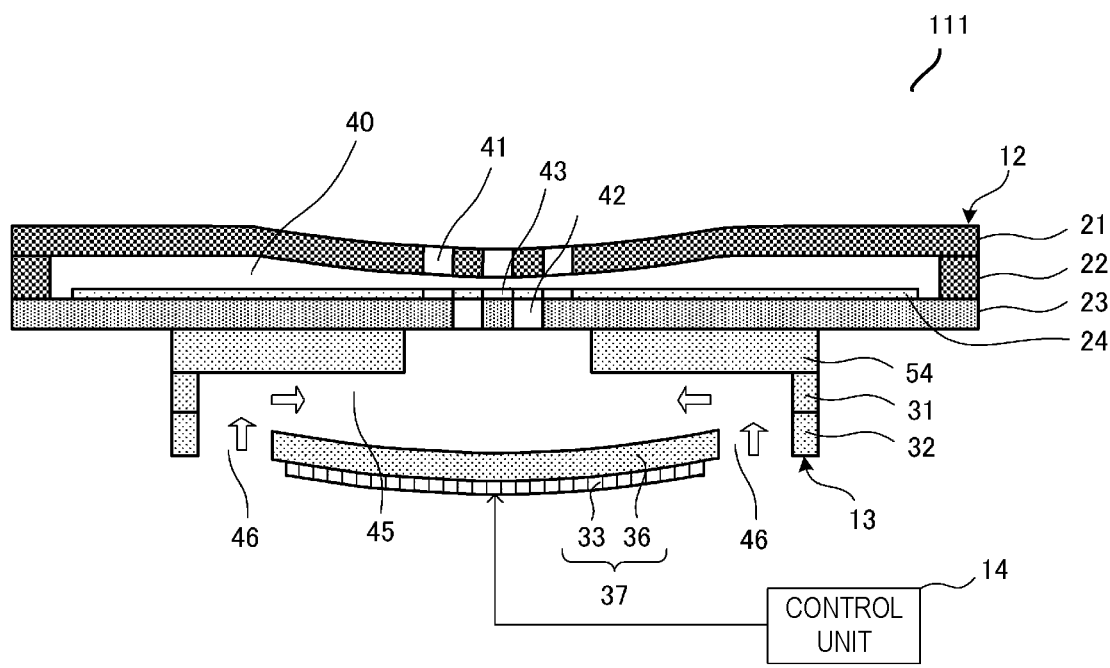
FIG. 10A and FIG. 10B are cross-sectional views of the gas control device 111 taken along the line S-S when the gas control device 111 illustrated in FIG. 1 is operated at a frequency of the first order mode (fundamental wave).
Figure 10B:
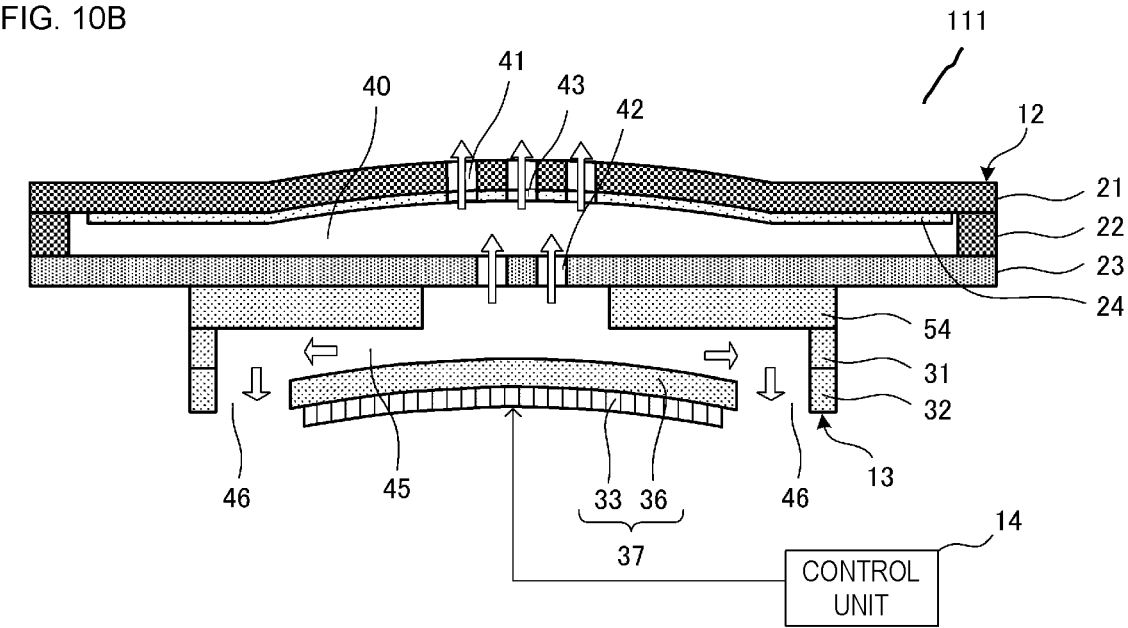

FIG. 10A and FIG. 10B are side cross-sectional views illustrating the air flow in the gas control device 111 while the pump 13 illustrated in FIG. 1 being driven.

In a state as illustrated in FIG. 9, when the control unit 14 applies an AC driving voltage of a first mode frequency (fundamental wave) to the electrodes formed on both the principal surfaces of the piezoelectric element 33, the piezoelectric element 33 expands and contracts to cause the vibration body 36 to perform the bending vibration in a concentric manner at a first mode resonant frequency "f". As a result, as illustrated in FIGS. 10A and 10B, the actuator 37 is bent and deformed, so that the volume of the pump chamber 45 is periodically changed.

As illustrated in FIG. 10A, when the vibration body 36 is bent toward the bottom surface side, the pressure in the pump chamber 45 decreases, and the movable plate 24 is pulled toward the bottom plate 23 side in the valve chamber 40 and comes into contact with the bottom plate 23. Thus, the movable plate 24 closes the second vent hole 42.

Further, as illustrated in FIG. 10B, when the vibration body 36 bends toward the top surface side, the pressure in the pump chamber 45 increases and the discharge air flowing from the second vent hole 42 toward the valve chamber 40 is generated. By this discharge air, the movable plate 24 is pressed toward the top surface side and comes into contact with the top plate 21.

As a result, the movable plate 24 opens the second vent hole 42, and the first vent hole 41 and the second vent hole 42 communicate with each other. Accordingly, the air in the pump chamber 45 is sucked into the valve chamber 40 through the second vent hole 42, and the air is discharged from the valve chamber 40 to the outside of the valve chamber 40 through the first vent hole 41.

Here, in the valve 12, the vibrations of the actuator 37 propagate directly from the pump 13, or transmit indirectly through the air, so that the vibrations are generated in the top plate 21.

Thus, the top plate 21 is also elastically deformed to move up and down in the thickness direction. As illustrated in FIG. 10B, when the actuator 37 bends toward the top surface side and the air in the pump chamber 45 is discharged from the second vent hole 42 into the valve chamber 40, the top plate 21 is bent toward the top surface side in the same manner as the actuator 37. As a result, the volume of the valve chamber 40 increases.

On the other hand, as illustrated in FIG. 10A, when the actuator 37 bends toward the bottom surface side, the top plate 21 is bent toward the bottom surface side by the reaction from the state illustrated in FIG. 10B. This decreases the volume of the valve chamber 40.

Accordingly, a moving distance and a moving time when the movable plate 24 is pulled toward the bottom surface side in the valve chamber 40 are shortened. Thus, the movable plate 24 can follow the fluctuation in air pressure, and the valve 12 becomes highly responsive.

Since the vibrations of the actuator 37 propagate directly from the pump 13, or transmit indirectly through the air, the bottom plate 23 may be vibrated in some case.

Hereinafter, a gas control device 811 according to a comparative example of the first embodiment of the present disclosure will be described.

Figure 11:
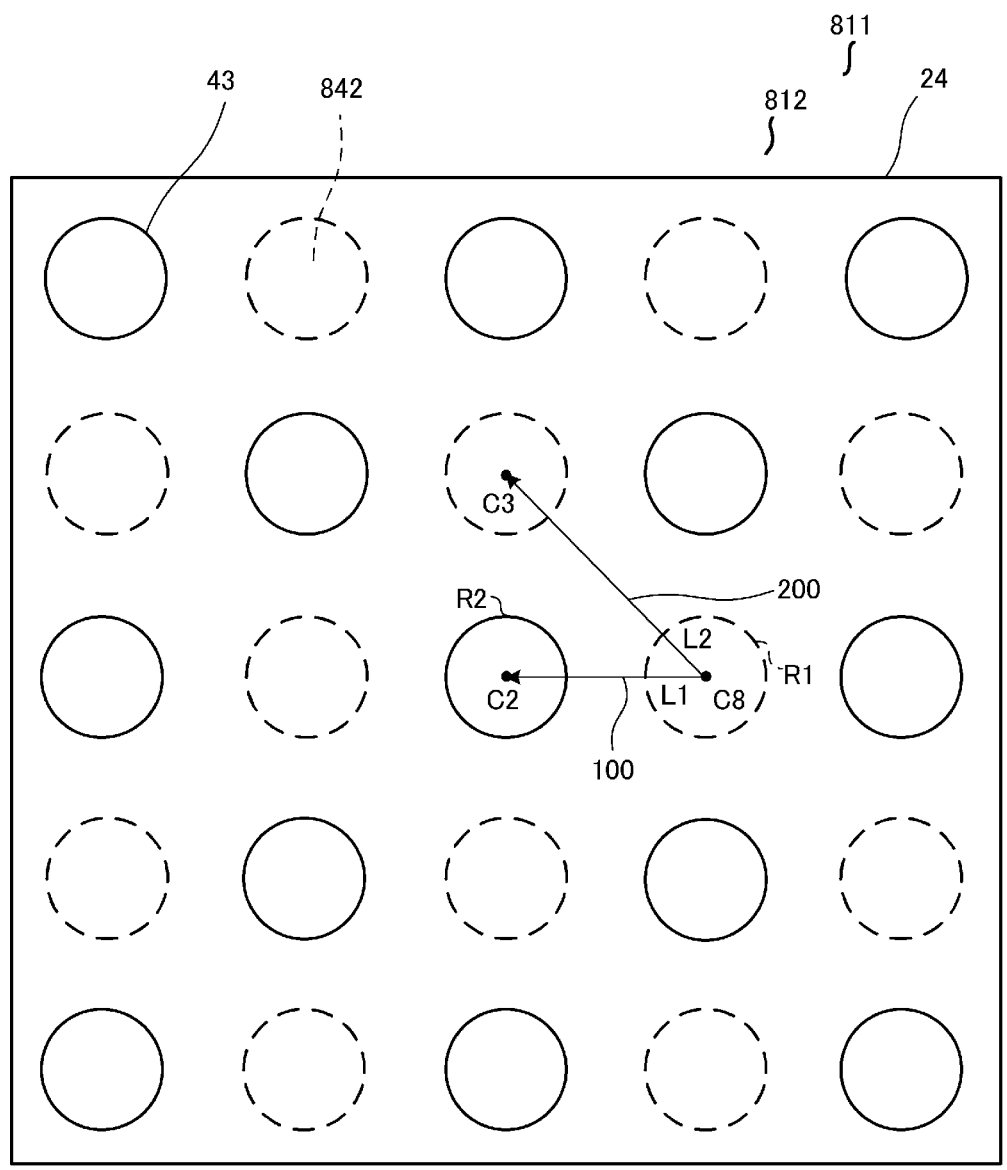
FIG. 11 is a transparent plan view of a central portion of a movable plate 24 of a valve 812 provided in a gas control device 811 according to a comparative example of the first embodiment of the present disclosure.

FIG. 11 is a transparent plan view of a central portion of a movable plate 24 of a valve 812 provided in the gas control device 811 according to the comparative example of the first embodiment of the present disclosure.

Figure 18:
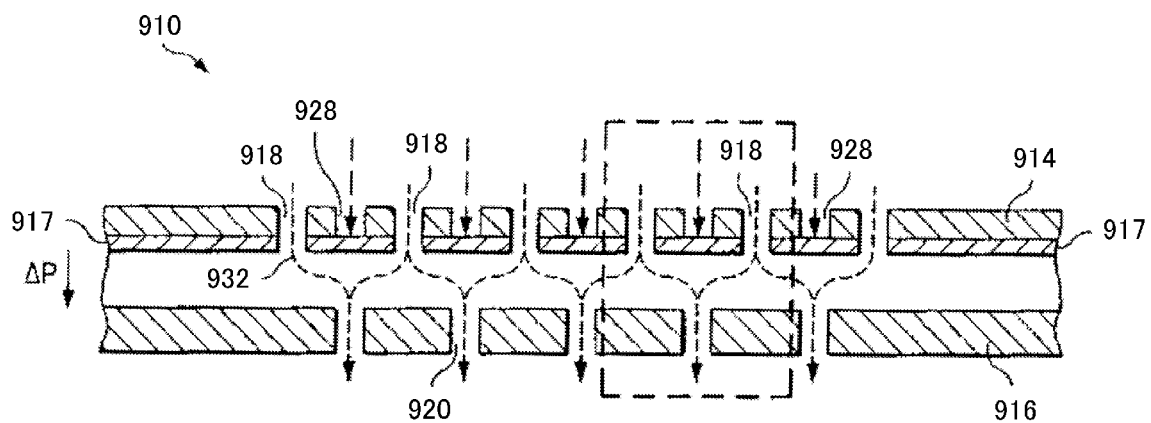
FIG. 18 is a cross-sectional view of a valve 910 according to Patent Document 1.
Figure 19:
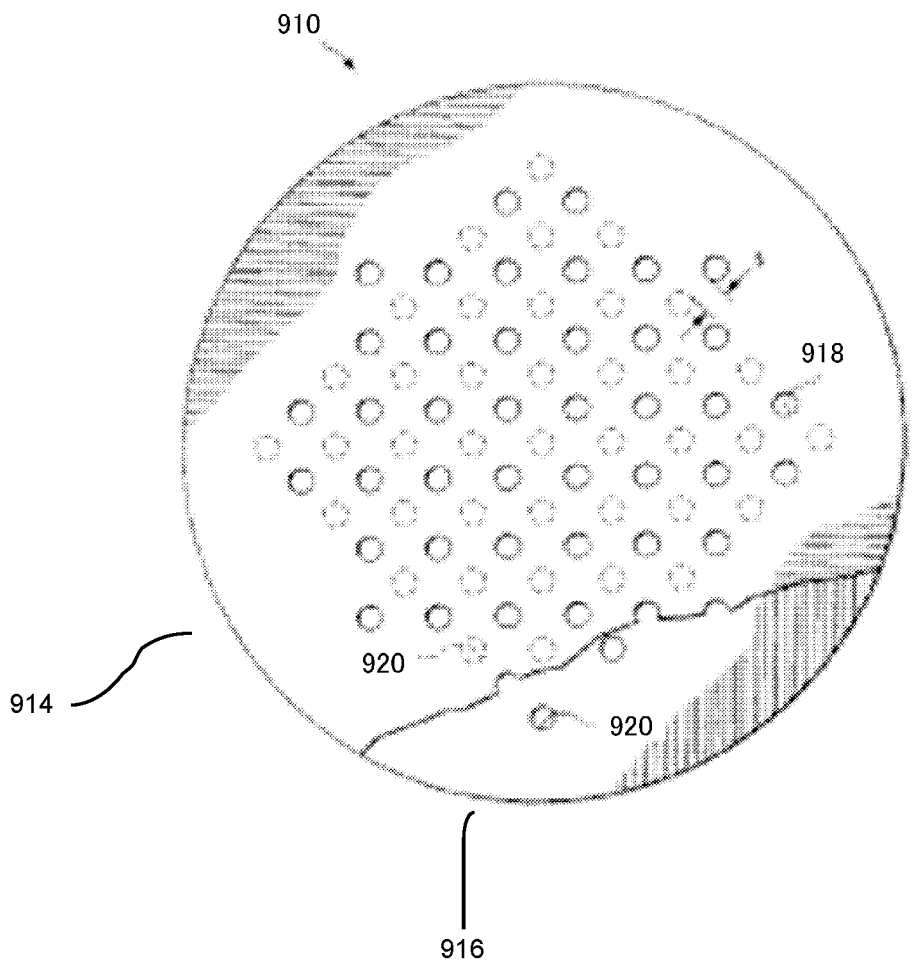
FIG. 19 is a plan view of the valve 910 illustrated in FIG. 18.

The valve 812 is different from the valve 12 of the gas control device 111 in the form of a plurality of second vent holes 842. Each second vent hole 842 of the plurality of second vent holes 842 has a circular shape. In other words, the valve 812 is the same type as the valve 910 illustrated in FIGS. 18 and 19. Accordingly, a distance from a center of gravity C8 of the second vent hole 842 to an outer circumference R1 of the second vent hole 842 is the same in any direction. Further, a total area of the plurality of second vent holes 42 is larger than a total area of the plurality of second vent holes 842. Furthermore, by forming the second vent hole 842 in a circular shape, the flow path resistance against the gas flowing through the second vent hole 842 can be reduced, so that the smooth movement can be achieved. Since other configurations are the same, the description thereof will be omitted.

Hereinafter, the pressure and flow rate characteristics of the gas control device 111 will be compared with the pressure and flow rate characteristics of the gas control device 811.

Figure 12:
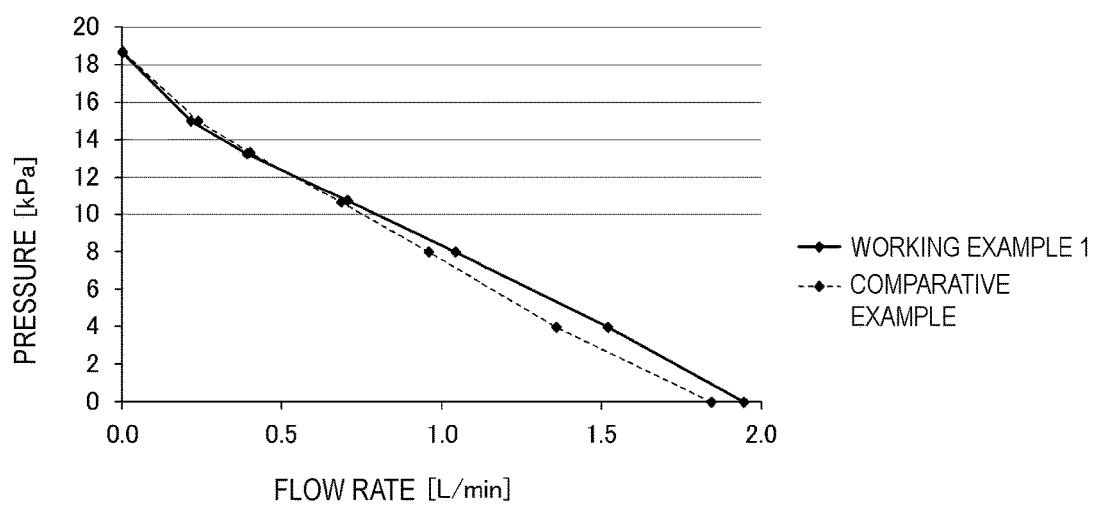
FIG. 12 is a graph comparing the pressure and flow rate characteristics of the gas control device 111 illustrated in FIG. 3 with the pressure and flow rate characteristics of the gas control device 811 illustrated in FIG. 11.

FIG. 12 is a graph comparing the pressure and flow rate characteristics of the gas control device 111 illustrated in FIG. 3 with the pressure and flow rate characteristics of the gas control device 811 illustrated in FIG. 11.

FIG. 12 shows a result of measurement in which, when the control unit 14 applied an AC driving voltage of the first mode frequency (fundamental wave) to the electrodes formed on both the principal surfaces of the piezoelectric element 33, the pressure and flow rate of the air discharged from the first vent hole 41 of the gas control device 111 and the pressure and flow rate of the air discharged from a first vent hole 41 of the gas control device 811 were measured.

In the measurement result shown in FIG. 12, it has been found that the pressure and flow rate of the air discharged from the first vent hole 41 of the gas control device 111, and the flow rate of the air discharged from the first vent hole 41 of the gas control device 811 increase at a pressure of 8 kPa or less. It can be considered that this measurement result has been obtained because the total area of the plurality of second vent holes 42 is larger than the total area of the plurality of second vent holes 842 so that the flow path resistance of the valve 12 is smaller. Further, it can be considered that the stated measurement result has been obtained because the flow path from the second vent hole 42 to the third vent hole 43 is shorter in length than the flow path from the second vent hole 842 to the third vent hole 43 so that the flow path resistance of the valve 12 in proportion to the length of the flow path is also smaller.

Further, as described above, the first distance L1 is equal to or longer than the set length. The set length is set in view of the manufacturing tolerance of the second vent hole 42 and the third vent hole 43 so that the second vent hole 42 and the third vent hole 43 do not overlap with each other in a plan view.

Accordingly, the valve 12 and the gas control device 111 function to direct the flow of gas in one direction and can allow the gas to pass through without decreasing the flow rate of the gas as much as possible.

In the above-discussed configuration, the total area of the plurality of second vent holes 42 is larger than that of the known vent holes 920. In addition, in the outer circumference of the second vent hole 42 and the outer circumference of the third vent hole 43 adjacent to the second vent hole 42, the number of portions having the shortest distance in a plan view in the direction in which the top plate 21 and the bottom plate 23 oppose each other is greater than that in the known valve 812. Accordingly, the distance between the outer circumference of the second vent hole 42 and the outer circumference of the third vent hole 43 adjacent to the second vent hole 42 becomes short on average in comparison with the known valve 812, and the flow path resistance of the valve 12 becomes smaller. Further, the flow path from the second vent hole 42 to the third vent hole 43 is shorter in length than the flow path from the known vent hole 920 to the known vent hole 918, so that the flow path resistance of the valve 12 in proportion to the length of the flow path also becomes smaller. Further, as described above, the first distance L1 is equal to or longer than the set length.

Second Embodiment

Next, a gas control device according to a second embodiment of the present disclosure will be described.

Figure 13:
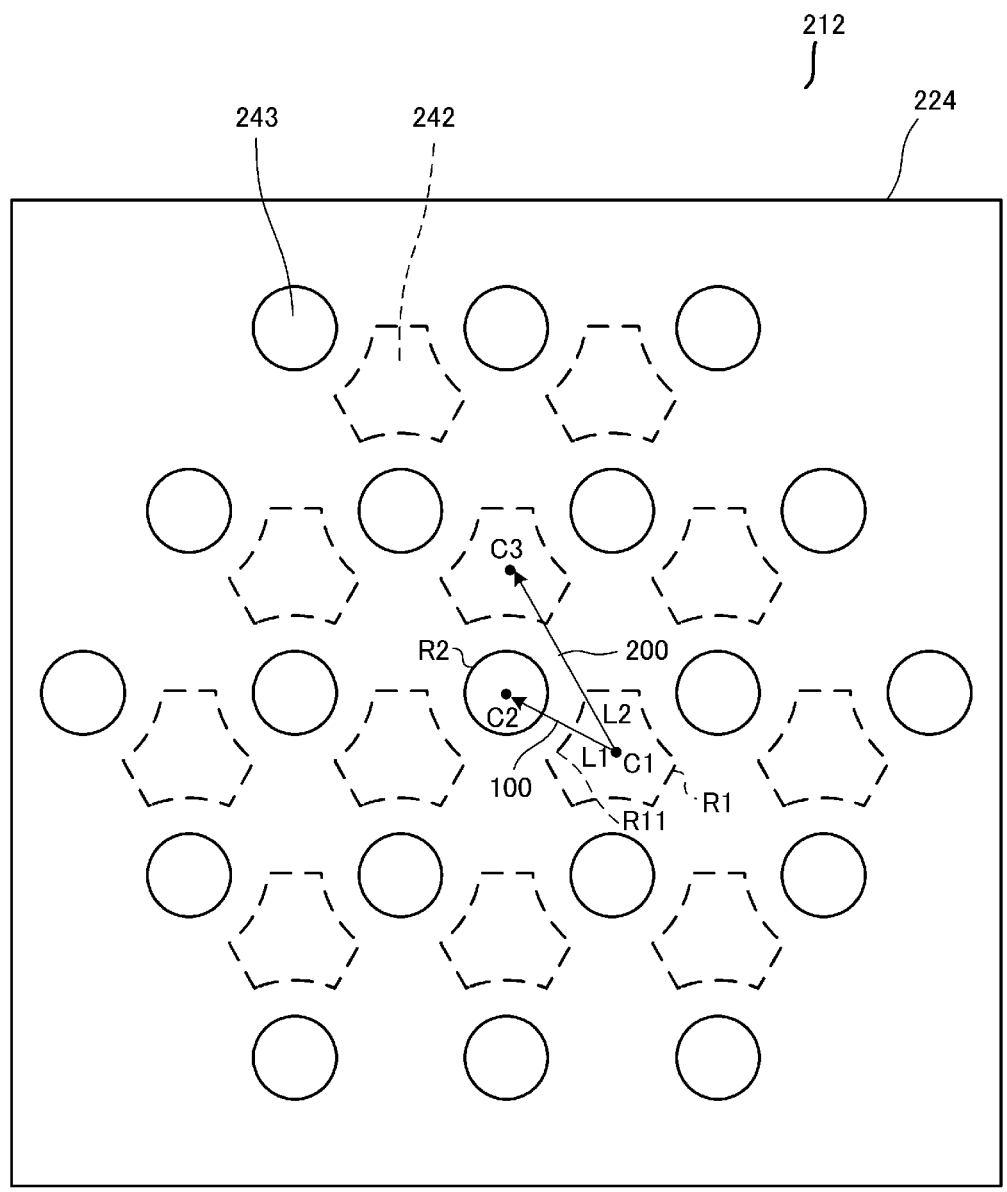
FIG. 13 is a transparent plan view of a central portion of a movable plate 224 of a valve 212 provided in a gas control device according to a second embodiment of the present disclosure.

FIG. 13 is a transparent plan view of a central portion of a movable plate 224 of a valve 212 provided in a gas control device according to the second embodiment of the present disclosure. The valve 212 differs from the valve 12 of the gas control device 111 (see FIG. 7) in the arrangement of a plurality of second vent holes 242 and a plurality of third vent holes 243. Since other configurations are the same, the description thereof will be omitted.

The plurality of third vent holes 243 and the plurality of second vent holes 242 are provided so as not to oppose each other. As illustrated in FIG. 13, each third vent hole 243 of the plurality of third vent holes 243 and each second vent hole 242 of the plurality of second vent holes 242 are alternately disposed so as to be adjacent to each other in a plan view of the movable plate 224. The third vent hole 243 has a circular shape. The shape of the second vent hole 242 is different from the shape of the second vent hole 42.

Of the distances from a center of gravity C1 of the second vent hole 242 to an outer circumference R1 of the second vent hole 242, a first distance L1 in a first direction 100 connecting the center of gravity C1 of the second vent hole 242 and a center of gravity C2 of the third vent hole 243 is the shortest, and a distance from the center of gravity C1 of the second vent hole 242 to the outer circumference R1 of the second vent hole 242 in a predetermined direction other than the first direction 100 is longer than the first distance L1. In particular, of the distances from the center of gravity C1 of the second vent hole 242 to the outer circumference R1 of the second vent hole 242, a second distance L2 in a second direction 200 connecting the center of gravity C1 and a center of gravity C3 of the two second vent holes 242 adjacent to each other is the longest.

The outer circumference R1 of the second vent hole 242 includes a segment R11 present at the same distance from a set region on an outer circumference R2 of the third vent hole 243. The segment R11 is formed in an arc shape taking the center of gravity C2 of the third vent hole 243 as its center. Further, as described above, the first distance L1 is equal to or longer than the set length. Further, it is preferable for the first distance L1 to be equal to or longer than the set length and to be as short as possible in order to make the flow path resistance small.

Accordingly, the valve 212, like the valve 12, functions to direct the flow of gas in one direction and can allow the gas to pass through without decreasing the flow rate of the gas as much as possible.

In the above-discussed configuration, the total area of the plurality of second vent holes 242 is wider than that of the known vent holes 920, so that the flow path resistance of the valve 212 becomes smaller. Further, the flow path from the second vent hole 242 to the third vent hole 243 is shorter in length than the flow path from the known vent hole 920 to the known vent hole 918, so that the flow path resistance of the valve 212 in proportion to the length of the flow path also becomes smaller. Further, as described above, the first distance L1 is equal to or longer than the set length.

Third Embodiment

Next, a gas control device according to a third embodiment of the present disclosure will be described.

Figure 14:
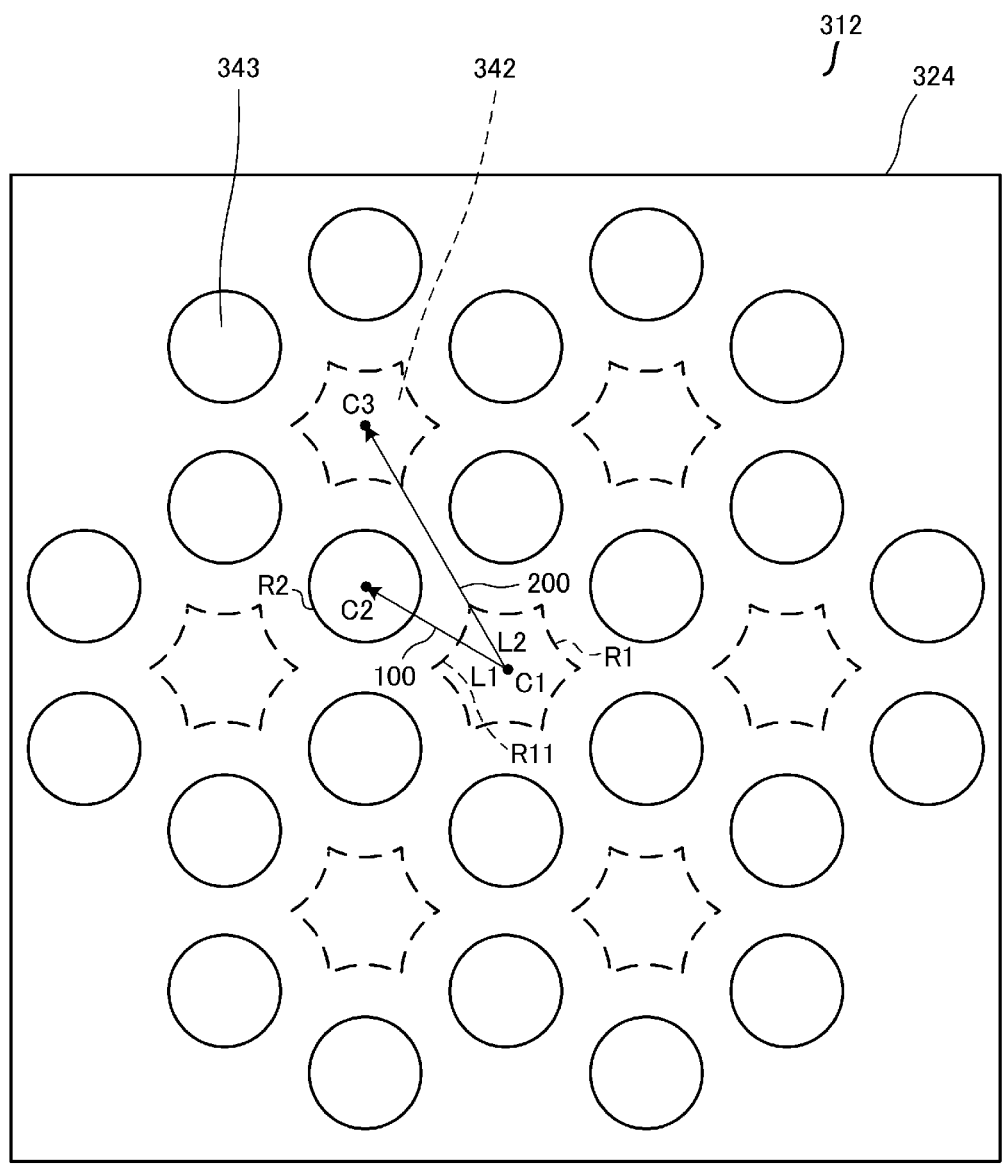
FIG. 14 is a transparent plan view of a central portion of a movable plate 324 of a valve 312 provided in a gas control device according to a third embodiment of the present disclosure.

FIG. 14 is a transparent plan view of a central portion of a movable plate 324 of a valve 312 provided in a gas control device according to the third embodiment of the present disclosure. The valve 312 differs from the valve 12 of the gas control device 111 (see FIG. 7) in the arrangement of a plurality of second vent holes 342 and a plurality of third vent holes 343. Since other configurations are the same, the description thereof will be omitted.

The plurality of third vent holes 343 and the plurality of second vent holes 342 are provided so as not to oppose each other. As illustrated in FIG. 14, each third vent hole 343 of the plurality of third vent holes 343 and each second vent hole 342 of the plurality of second vent holes 342 are alternately disposed so as to be adjacent to each other in a plan view of the movable plate 324. The second vent hole 342 is surrounded by four or more of the third vent holes 343 in a plan view of the movable plate 324. Therefore, the number of the directions in which the gas flows increases, so that the flow path resistance is reduced. The third vent hole 343 has a circular shape. The shape of the second vent hole 342 is different from the shape of the second vent hole 42.

Of the distances from a center of gravity C1 of the second vent hole 342 to an outer circumference R1 of the second vent hole 342, a first distance L1 in a first direction 100 connecting the center of gravity C1 of the second vent hole 342 and a center of gravity C2 of the third vent hole 343 is the shortest, and a distance from the center of gravity C1 of the second vent hole 342 to the outer circumference R1 of the second vent hole 342 in a predetermined direction other than the first direction 100 is longer than the first distance L1. In particular, of the distances from the center of gravity C1 of the second vent hole 342 to the outer circumference R1 of the second vent hole 342, a second distance L2 in a second direction 200 connecting the center of gravity C1 and a center of gravity C3 of the two second vent holes 342 adjacent to each other is the longest.

The outer circumference R1 of the second vent hole 342 includes a segment R11 present at the same distance from a set region on an outer circumference R2 of the third vent hole 343. The segment R11 is formed in an arc shape taking the center of gravity C2 of the third vent hole 343 as its center. Further, as described above, the first distance L1 is equal to or longer than the set length. Further, it is preferable for the first distance L1 to be equal to or longer than the set length and to be as short as possible in order to make the flow path resistance small.

Accordingly, the valve 312, like the valve 12, functions to direct the flow of gas in one direction and can allow the gas to pass through without decreasing the flow rate of the gas as much as possible.

In the above-discussed configuration, the total area of the plurality of second vent holes 342 is wider than that of the known vent holes 920, so that the flow path resistance of the valve 312 becomes smaller. Further, the flow path from the second vent hole 342 to the third vent hole 343 is shorter in length than the flow path from the known vent hole 920 to the known vent hole 918, so that the flow path resistance of the valve 312 in proportion to the length of the flow path also becomes smaller. Further, as described above, the first distance L1 is equal to or longer than the set length.

Fourth Embodiment

Next, a gas control device according to a fourth embodiment of the present disclosure will be described.

Figure 15:
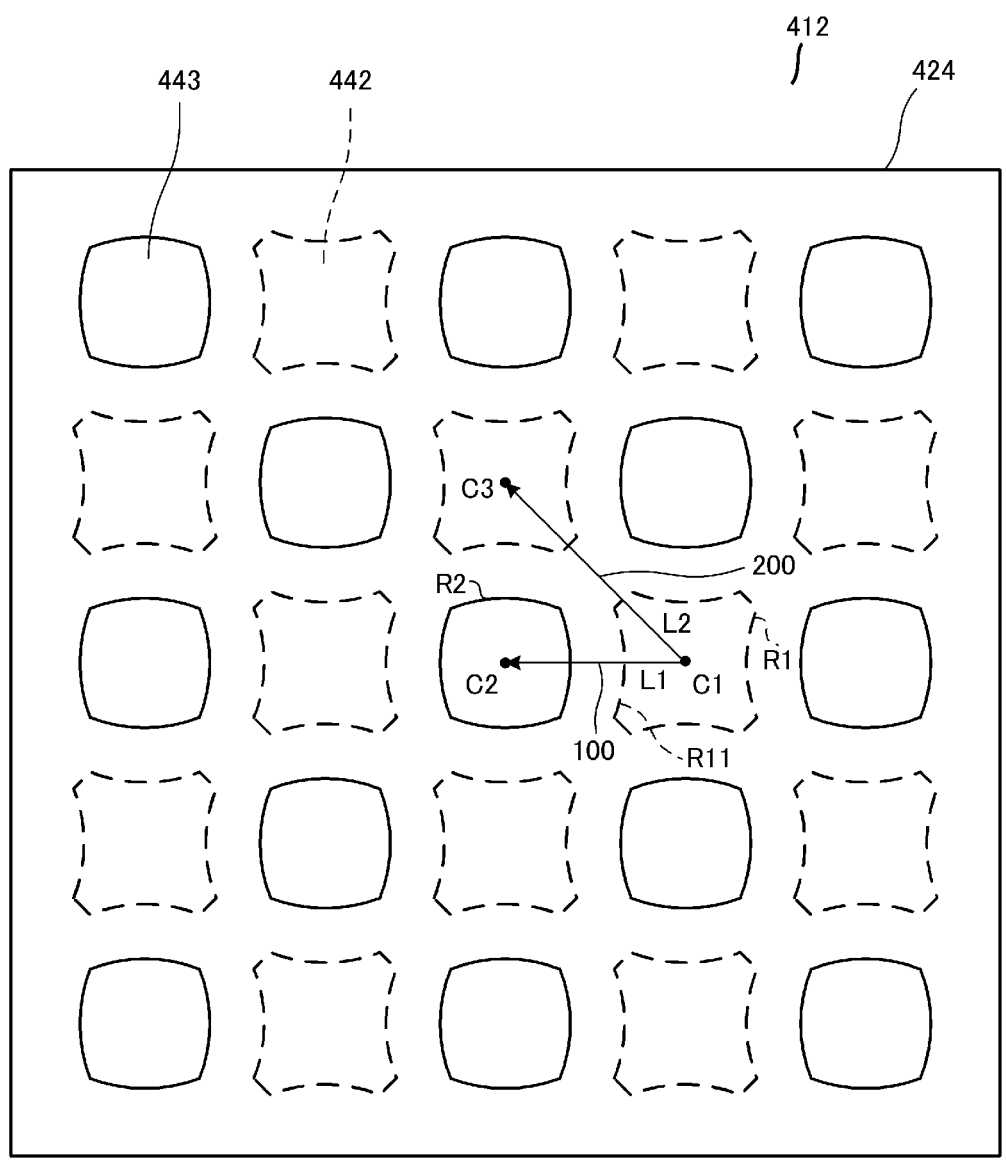
FIG. 15 is a transparent plan view of a central portion of a movable plate 424 of a valve 412 provided in a gas control device according to a fourth embodiment of the present disclosure.

FIG. 15 is a transparent plan view of a central portion of a movable plate 424 of a valve 412 provided in a gas control device according to the fourth embodiment of the present disclosure. The valve 412 differs from the valve 12 of the gas control device 111 (see FIG. 7) in the arrangement of a plurality of second vent holes 442 and a plurality of third vent holes 443. Since other configurations are the same, the description thereof will be omitted.

The plurality of third vent holes 443 and the plurality of second vent holes 442 are provided so as not to oppose each other. As illustrated in FIG. 15, each third vent hole 443 of the plurality of third vent holes 443 and each second vent hole 442 of the plurality of second vent holes 442 are alternately disposed so as to be adjacent to each other in a plan view of the movable plate 424. The second vent hole 442 is surrounded by four or more of the third vent holes 443 in a plan view of the movable plate 424. Therefore, the number of the directions in which the gas flows increases, so that the flow path resistance is reduced. The shape of the third vent hole 443 is different from the shape of the third vent hole 43. The shape of the second vent hole 442 is different from the shape of the second vent hole 42.

Of the distances from a center of gravity C1 of the second vent hole 442 to an outer circumference R1 of the second vent hole 442, a first distance L1 in a first direction 100 connecting the center of gravity C1 of the second vent hole 442 and a center of gravity C2 of the third vent hole 443 is the shortest, and a distance from the center of gravity C1 of the second vent hole 442 to the outer circumference R1 of the second vent hole 442 in a predetermined direction other than the first direction 100 is longer than the first distance L1. In particular, of the distances from the center of gravity C1 of the second vent hole 442 to the outer circumference R1 of the second vent hole 442, a second distance L2 in a second direction 200 connecting the center of gravity C1 and a center of gravity C3 of the two second vent holes 442 adjacent to each other is the longest.

The outer circumference R1 of the second vent hole 442 includes a segment R11 being at the same distance from a set region on an outer circumference R2 of the third vent hole 443. The segment R11 is formed in an arc shape taking the center of gravity C2 of the third vent hole 443 as its center. Further, as described above, the first distance L1 is equal to or longer than the set length. Further, it is preferable for the first distance L1 to be equal to or longer than the set length and to be as short as possible in order to make the flow path resistance small.

Accordingly, the valve 412, like the valve 12, functions to direct the flow of gas in one direction and can allow the gas to pass through without decreasing the flow rate of the gas as much as possible.

In the above-discussed configuration, the total area of the plurality of second vent holes 442 is wider than that of the known vent holes 920, so that the flow path resistance of the valve 412 becomes smaller. Further, the flow path from the second vent hole 442 to the third vent hole 443 is shorter in length than the flow path from the known vent hole 920 to the known vent hole 918, so that the flow path resistance of the valve 412 in proportion to the length of the flow path also becomes smaller. Further, as described above, the first distance L1 is equal to or longer than the set length.

Fifth Embodiment

Next, a gas control device according to a fifth embodiment of the present disclosure will be described.

Figure 16:
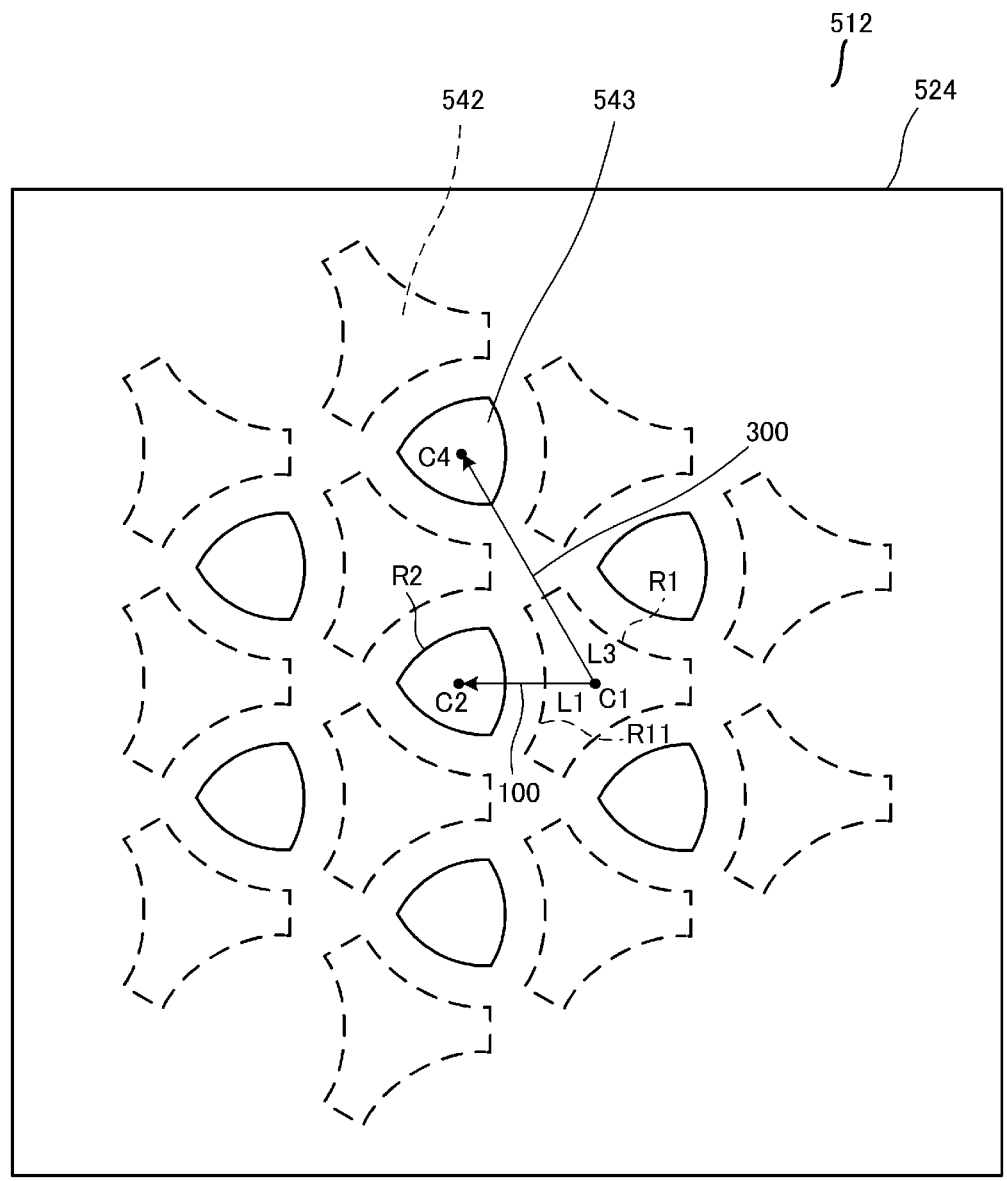
FIG. 16 is a transparent plan view of a central portion of a movable plate 524 of a valve 512 provided in a gas control device according to a fifth embodiment of the present disclosure.

FIG. 16 is a transparent plan view of a central portion of a movable plate 524 of a valve 512 provided in a gas control device according to the fifth embodiment of the present disclosure. The valve 512 differs from the valve 12 of the gas control device 111 (see FIG. 7) in the form of a plurality of second vent holes 542 and a plurality of third vent holes 543. Since other configurations are the same, the description thereof will be omitted.

The plurality of third vent holes 543 and the plurality of second vent holes 542 are provided so as not to oppose each other. As illustrated in FIG. 16, each third vent hole 543 of the plurality of third vent holes 543 and each second vent hole 542 of the plurality of second vent holes 542 are alternately disposed so as to be adjacent to each other in a plan view of the movable plate 524. The shape of the third vent hole 543 is different from the shape of the third vent hole 43. The shape of the second vent hole 542 is different from the shape of the second vent hole 42.

Of the distances from a center of gravity C1 of the second vent hole 542 to an outer circumference R1 of the second vent hole 542, a first distance L1 in a first direction 100 connecting the center of gravity C1 of the second vent hole 542 and a center of gravity C2 of the third vent hole 543 is the shortest, and a distance from the center of gravity C1 of the second vent hole 542 to the outer circumference R1 of the second vent hole 542 in a predetermined direction other than the first direction 100 is longer than the first distance L1. In particular, of the distances from the center of gravity C1 of the second vent hole 542 to the outer circumference R1 of the second vent hole 542, a third distance L3 in a third direction 300 connecting the center of gravity C1 of the second vent hole 542 and a center of gravity C4 of the third vent hole 543 is the longest.

The outer circumference R1 of the second vent hole 542 includes a segment R11 being at the same distance from a set region on an outer circumference R2 of the third vent hole 543. The segment R11 is formed in an arc shape taking the center of gravity C2 of the third vent hole 543 as its center. Further, as described above, the first distance L1 is equal to or longer than the set length. Further, it is preferable for the first distance L1 to be equal to or longer than the set length and to be as short as possible in order to make the flow path resistance small.

Accordingly, the valve 512, like the valve 12, functions to direct the flow of gas in one direction and can allow the gas to pass through without decreasing the flow rate of the gas as much as possible.

In the above-discussed configuration, the total area of the plurality of second vent holes 542 is wider than that of the known vent holes 920, so that the flow path resistance of the valve 512 becomes smaller. Further, the flow path from the second vent hole 542 to the third vent hole 543 is shorter in length than the flow path from the known vent hole 920 to the known vent hole 918, so that the flow path resistance of the valve 512 in proportion to the length of the flow path also becomes smaller. Further, as described above, the first distance L1 is equal to or longer than the set length.

Sixth Embodiment

Next, a gas control device according to a sixth embodiment of the present disclosure will be described.

Figure 17:
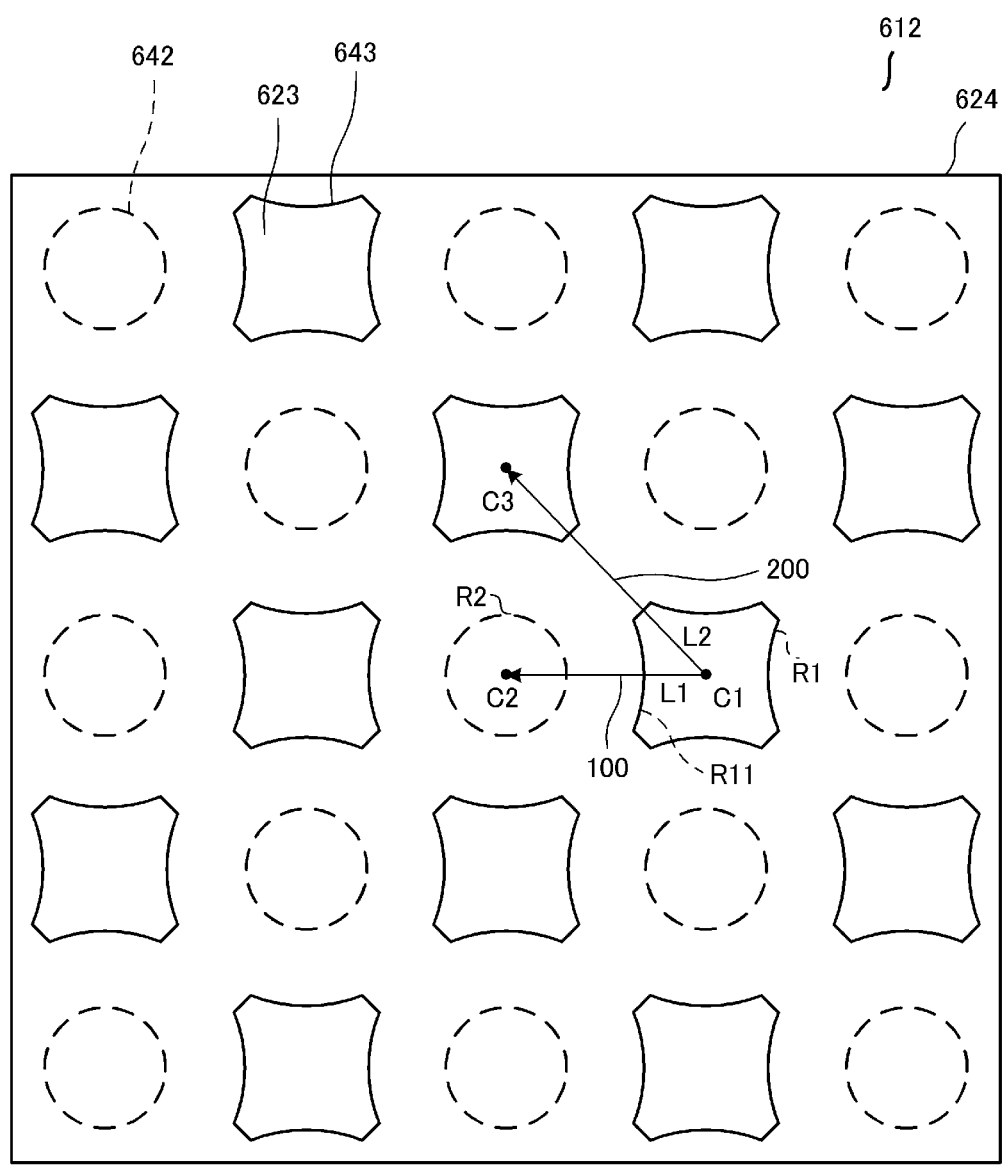
FIG. 17 is a transparent plan view of a central portion of a movable plate 624 of a valve 612 provided in a gas control device according to a sixth embodiment of the present disclosure.

FIG. 17 is a transparent plan view of a central portion of a movable plate 624 of a valve 612 provided in a gas control device according to the sixth embodiment of the present disclosure. The valve 612 differs from the valve 12 of the gas control device 111 (see FIG. 7) in that a plurality of circular-shaped second vent holes 642 is provided in a bottom plate 623 and a plurality of octagonal-shaped third vent holes 643 is provided in the movable plate 624. That is, in the valve 612 and the valve 12, circular-shaped holes and octagonal-shaped holes are reversely provided. Since other configurations are the same, the description thereof will be omitted.

The plurality of third vent holes 643 and the plurality of second vent holes 642 are provided so as not to oppose each other. As illustrated in FIG. 17, each third vent hole 643 of the plurality of third vent holes 643 and each second vent hole 642 of the plurality of second vent holes 642 are alternately disposed so as to be adjacent to each other in a plan view of the movable plate 624. The third vent hole 643 is surrounded by four or more of the second vent holes 642 in a plan view of the movable plate 624. Therefore, the number of directions in which the gas flows increases, so that the flow path resistance is reduced. The shape of the third vent hole 643 is the same as the shape of the second vent hole 42. The shape of the second vent hole 642 is the same as the shape of the third vent hole 43.

Of the distances from a center of gravity C1 of the third vent hole 643 to an outer circumference R1 of the third vent hole 643, a first distance L1 in a first direction 100 connecting the center of gravity C1 of the third vent hole 643 and a center of gravity C2 of the second vent hole 642 is the shortest, and a distance from the center of gravity C1 of the third vent hole 643 to the outer circumference R1 of the third vent hole 643 in a predetermined direction other than the first direction 100 is longer than the first distance L1. In particular, of the distances from the center of gravity C1 of the third vent hole 643 to the outer circumference R1 of the third vent hole 643, a second distance L2 in a second direction 200 connecting the center of gravity C1 and a center of gravity C3 of the two third vent holes 643 adjacent to each other is the longest.

The outer circumference R1 of the third vent hole 643 includes a segment R11 being at the same distance from a set region on an outer circumference R2 of the second vent hole 642. The segment R11 is formed in an arc shape taking the center of gravity C2 of the second vent hole 642 as its center.

In the above-discussed configuration, the total area of the plurality of third vent holes 643 is wider than that of the known vent holes 920, so that the flow path resistance of the valve 612 becomes smaller. Further, the flow path from the second vent hole 642 to the third vent hole 643 is shorter in length than the flow path from the known vent hole 920 to the known vent hole 918, so that the flow path resistance of the valve 612 in proportion to the length of the flow path also becomes smaller. Further, as described above, the first distance L1 is equal to or longer than the set length. Further, it is preferable for the first distance L1 to be equal to or longer than the set length and to be as short as possible in order to make the flow path resistance small.

Accordingly, the valve 612, like the valve 12, functions to direct the flow of gas in one direction and can allow the gas to pass through without decreasing the flow rate of the gas as much as possible.

In addition, in the valve 612 and the valve 12, although circular-shaped holes and octagonal-shaped holes are reversely provided, the present disclosure is not limited thereto. The above-discussed arrangement can also be applied to the valve 212, the valve 312, the valve 412, and the valve 512. For example, in the valve 312, a plurality of star-shaped third vent holes may be provided in the movable plate, and a plurality of circular-shaped second vent holes may be provided in the bottom plate.

Other Embodiments

Although the air is used as a gas in the above-described embodiments, the present disclosure is not limited thereto.

The present disclosure can also be applied in a case where the above-mentioned gas is a gas other than the air.

Although, in the above embodiments, the pump upper chamber 55 (discharge hole 55) is connected to the second vent hole 42, the present disclosure is not limited thereto. For example, the suction hole 46 may be connected to the first vent hole 41.

Although, in the above embodiments, each of the plates constituting the valve, the piezoelectric pump, and the like is made of SUS, the present disclosure is not limited thereto. For example, the stated plates may be made of other materials such as aluminum, titanium, magnesium, copper, and the like.

Further, although a piezoelectric element is provided as a driving source of the pump in the above embodiments, the present disclosure is not limited thereto. For example, the pump may be constituted as a pump configured to perform a pumping operation with electromagnetic drive.

Although, in the above embodiments, the piezoelectric element is made of PZT-based ceramics, the present disclosure is not limited thereto. For example, the piezoelectric element may be made of a piezoelectric material of lead-free piezoelectric ceramics such as potassium sodium niobate ceramics or alkali niobate ceramics, or the like.

Although a unimorph type piezoelectric vibrator is used in the above embodiments, the present disclosure is not limited thereto. A bimorph type piezoelectric vibrator in which the piezoelectric element 33 is attached on each of both surfaces of the vibration body 36 may be used.

Although, in the above embodiments, the disk-shaped piezoelectric element 33 and the disk-shaped vibration body 36 are used, the present disclosure is not limited thereto. For example, the shapes thereof may be rectangular or polygonal.

Although, in the above embodiments, the vibration plate of the piezoelectric pump is bent and vibrated at the frequency of the first order mode, the present disclosure is not limited thereto. At the time of implementation, the vibration plate may be bent and vibrated in the vibration mode of an odd order equal to or greater than a third order configured to form a plurality of antinodes of vibration.

Although, in the above embodiments, the pump chamber 45 has a circular cylinder shape, the present disclosure is not limited thereto. At the time of implementation, the pump chamber may be formed in a regular prism shape.

Finally, it is to be understood that the description of the above embodiments is illustrative in all respects and is not intended to be limiting. The scope of the present disclosure is defined by the appended claims rather than by the above embodiments. Further, the scope of the present disclosure includes the meaning equivalent to the scope of the claims.

12, 212, 312, 412, 512, 612, 812 VALVE
13 PUMP
14 CONTROL UNIT
21 TOP PLATE
22 SIDE WALL PLATE
23 BOTTOM PLATE
24, 224, 324, 424, 524, 624 MOVABLE PLATE
25 PROJECTION
26 CUTOUT
31 SIDE WALL PLATE
32 VIBRATION PLATE
33 PIEZOELECTRIC ELEMENT
34 OUTER CIRCUMFERENCE PORTION
35 BEAM
36 VIBRATION BODY
37 ACTUATOR

40 VALVE CHAMBER
41 FIRST VENT HOLE
42, 242, 342, 442, 542, 642, 842 SECOND VENT HOLE
43, 243, 343, 443, 543, 643 THIRD VENT HOLE
45 PUMP CHAMBER
46 SUCTION HOLE
48 PUMP LOWER CHAMBER
54 VIBRATION ADJUSTMENT PLATE
55 PUMP UPPER CHAMBER (DISCHARGE HOLE)
100 FIRST DIRECTION
111, 811 GAS CONTROL DEVICE
200 SECOND DIRECTION
300 THIRD DIRECTION
301 OPPOSING EDGE
623 BOTTOM PLATE
910 VALVE
914, 916 PLATE
917 FLAP
918, 920 VENT HOLE
928 AUXILIARY HOLE

The invention claimed is:

1. A valve comprising:
a first plate having a first principal surface and a plurality of first vent holes;
a side wall plate;
a second plate having a second principal surface and a plurality of second vent holes, wherein the first plate and the second plate are disposed on opposite sides of the side wall plate with the first principal surface facing the second principal surface and wherein the first plate, the second plate and the side wall plate define a valve chamber; and
a third plate disposed in the valve chamber and having a plurality of third vent holes, a third principal surface facing the first principal surface and a fourth principal surface facing the second principal surface, wherein when viewed in a direction perpendicular to the first principal surface the plurality of third vent holes at least partially overlaps the plurality of first vent holes and does not overlap the plurality of second vent holes,
wherein, when viewed in the direction perpendicular to the first principal surface:
a portion of a peripheral edge of each second vent hole is contoured to match an opposing portion of a peripheral edge of an adjacent third vent hole, and
a shortest distance between the peripheral outer edge of the second vent hole and the peripheral outer edge of the adjacent third vent hole is between a predetermined distance and 1.2 times the predetermined distance.

2. The valve according to claim 1,
wherein the predetermined distance is greater than zero and based on a manufacturing tolerance of a position and size of the second vent hole and the third vent hole.

3. The valve according to claim 1,
wherein the portion of the peripheral edge of the second vent hole and the opposing portion of the peripheral edge of the adjacent third vent hole are substantially parallel to each other.

4. The valve according to claim 1,
wherein an area of the second vent hole is larger than an area of the third vent hole.

5. The valve according to claim 1,
wherein an area of the third vent hole is larger than an area of the second vent hole.

6. The valve according to claim 1,
wherein the third vent hole is formed in a circular shape.

7. The valve according to claim 1,
wherein the second vent hole is formed in a circular shape.

8. The valve according to claim 1,
wherein, in all combinations of the second vent holes and the third vent holes respectively closest to the second vent holes, the outer circumference of each of the second vent holes and the outer circumference of each of the third vent holes closest to each of the stated second vent holes include opposing edges matching each other in a plan view in the direction in which the first plate and the second plate oppose each other, and
the distance between the second vent hole and the third vent hole at the opposing edges is equal to or less than 1.2 times the shortest distance between the outer circumference of the second vent hole and the outer circumference of the third vent hole.

9. A valve comprising:
a first plate having a plurality of first vent holes and a first principal surface;
a side wall plate;
a second plate having a second principal surface and a plurality of second vent holes, wherein the first plate and the second plate are disposed on opposite sides of the side wall plate with the first principal surface facing the second principal surface and wherein the first plate, the second plate and the side wall plate define a valve chamber; and
a third plate disposed in the valve chamber and having a plurality of third vent holes, a third principal surface facing the first principal surface and a fourth principal surface facing the second principal surface, wherein in a direction perpendicular to the first principal surface the plurality of third vent holes at least partially overlaps the plurality of first vent holes and does not overlap the plurality of second vent holes,
wherein the second plate and the third plate are positioned such that when viewed in the direction perpendicular to the first principal surface:
each second vent hole is surrounded by at least three adjacent third vent holes,
a first distance from a center of gravity of the second vent hole to an outer peripheral edge of the second vent hole is shortest in a first direction connecting the center of gravity of the second vent hole and a center of gravity of a nearest adjacent third vent hole, and
in a predetermined direction other than the first direction, a second distance from the center of gravity of the second vent hole to the outer peripheral edge of an adjacent second vent hole is longer than the first distance.

10. The valve according to claim 9,
wherein the second distance from the center of gravity of the second vent hole to the outer peripheral edge of the adjacent second vent hole is longest in a second direction connecting the center of gravity of the second vent hole to the center of gravity of the adjacent second vent hole.

11. The valve according to claim 9,
wherein the outer peripheral edge of the second vent hole includes a segment that is contoured to matched an opposing segment of an outer peripheral edge of the third vent hole.

12. The valve according to claim 11,
wherein the segment of the outer peripheral edge of the second vent hole is an arc having a center at the center of gravity of the third vent hole.

13. The valve according to claim 9,
wherein the third vent hole is formed in a circular shape.

14. The valve according to claim 9,
wherein the second vent hole is surrounded by four or more of the third vent holes.

15. A valve comprising:
a first plate having a plurality of first vent holes and a first principal surface; a side wall plate;
a second plate having a second principal surface and a plurality of second vent holes, wherein the first plate and the second plate are disposed on opposite sides of the side wall plate with the first principal surface facing the second principal surface and wherein the first plate, the second plate and the side wall plate define a valve chamber; and
a third plate disposed in the valve chamber and having a plurality of third vent holes, a third principal surface facing the first principal surface and a fourth principal surface facing the second principal surface, wherein when viewed in a direction perpendicular to the first principal surface the plurality of third vent holes at least partially overlaps the plurality of first vent holes and does not overlap the plurality of second vent holes,
wherein the second plate and the third plate are positioned such that when viewed in the direction perpendicular to the first principal surface:
each second vent hole is surrounded by at least three adjacent third holes,
a first distance from a center of gravity of a respective third vent hole to an outer peripheral edge of the third vent hole is shortest in a first direction connecting the center of gravity of the third vent hole and a center of gravity of a nearest adjacent second vent hole, and
in a predetermined direction other than the first direction, a second distance from the center of gravity of a respective second vent hole to an outer peripheral edge of the adjacent second vent hole is longer than the first distance.

16. The valve according to claim 15,
wherein the first distance from the center of gravity of the third vent hole to the outer peripheral edge of the third vent hole is longest in a second direction connecting the center of gravity of the third vent hole to the center of gravity of an adjacent third vent hole.

17. The valve according to claim 15,
wherein the outer peripheral edge of the third vent hole includes a segment that is contoured to match an opposing segment of an adjacent outer peripheral edge of the second vent hole.

18. The valve according to claim 17,
wherein the outer peripheral edge of the third vent hole is an arc having a center at the center of gravity of the second vent hole.

19. The valve according to claim 15,
wherein the second vent hole is formed in a circular shape.

20. The valve according to claim 15,
wherein the third vent hole is surrounded by four or more of the second vent holes.

21. A gas control device comprising:
the valve according to claim 1; and
a pump connected to the above valve.

\* \* \* \* \*

UNITED STATES PATENT AND TRADEMARK OFFICE
CERTIFICATE OF CORRECTION

PATENT NO. : 10,871,156 B2
APPLICATION NO. : 16/260303
DATED : December 22, 2020
INVENTOR(S) : Nobuhira Tanaka et al.

It is certified that error appears in the above-identified patent and that said Letters Patent is hereby corrected as shown below:

In the Specification

Column 6, Line 10, please insert -- 50 μm, -- between "than" and "and".

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*